United States Patent

Raue et al.

[15] 3,647,349
[45] Mar. 7, 1972

[54] PROCESS FOR THE DYEING AND PRINTING OF SHAPED MATERIALS OF POLYMERS FROM ACRYLONITRILE, AS.-DICYANOETHYLENE OR ACID-MODIFIED AROMATIC ESTERS

[72] Inventors: Roderich Raue, Leverkusen; Willi Eifler, Cologne-Stammheim; Hans-Peter Kuhlthau, Leverkusen, all of Germany

[73] Assignee: Farbenfabriken Bayer Aktiengesellschaft, Leverkusen, Germany

[22] Filed: Nov. 20, 1969

[21] Appl. No.: 878,549

[30] Foreign Application Priority Data

Nov. 29, 1968 Germany.....................P 18 11 652.4
Nov. 29, 1968 Germany.....................P 18 11 651.3
Nov. 28, 1968 Germany.....................P 18 11 336.5
Nov. 28, 1968 Germany.....................P 18 11 338.7
Nov. 28, 1968 Germany.....................P 18 11 337.6

[52] U.S. Cl.......................................8/4, 8/177 AB, 8/179, 260/390, 260/393, 260/394
[51] Int. Cl. .......................................D06p 3/76
[58] Field of Search................8/177 AB, 168 A, 4; 260/390, 260/393, 394

[56] References Cited

UNITED STATES PATENTS 3,184,483  5/1965  Quint et al. ............................260/393
3,529,921  9/1970  Hegar et al. .........................8/177 AB Primary Examiner—George F. Lesmes
Assistant Examiner—T. J. Herbert, Jr.
Attorney—Plumley and Tyner

[57] ABSTRACT

The dyeing or printing of polymers of acrylonitrile, polymers of as.-dicyanoethylene, or acid-modified aromatic polyesters, or acid-modified superpolyamides by using as a dyestuff a triaryl-methane compound which is free from sulphonic acid and carboxylic acid groups, and has the formula

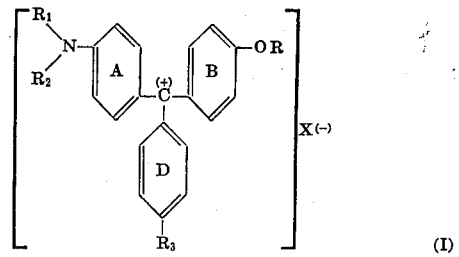

(I)

in which R is alkyl, aralkyl, cycloalkyl or aryl; $R_1$ is hydrogen, alkyl, aralkyl or cycloalkyl; $R_2$ is alkyl, aralkyl, cycloalkyl or aryl; $R_1$ and $R_2$ together with the nitrogen atom, or $R_1$ or $R_2$ with a carbon atom in the O-position in the ring A may form a heterocyclic ring; $R_3$ is hydrogen, alkyl, aralkyl, aryl, alkoxy, aralkoxy, aryloxy, alkylmercapto, arylmercapto, halogen, carboxylic acid ester radical, carbonamido, sulphonamido, cyano, nitro, alkylsulphonyl, aralkylsulphonyl, arylsulphonyl, or acyl; and X is the radical of an anion.

8 Claims, No Drawings

PROCESS FOR THE DYEING AND PRINTING OF SHAPED MATERIALS OF POLYMERS FROM ACRYLONITRILE, AS.-DICYANOETHYLENE OR ACID-MODIFIED AROMATIC ESTERS

This invention comprises a new process for dyeing or printing shaped materials of polymers or copolymers of acrylonitrile or as.dicyanoethylene, or of acid-modified aromatic polyesters, or of acid-modified superpolyamides.

The dyeing or printing process according to the invention is characterized by using as a dyestuff for the process a triarylmethane compound which is free from sulphonic acid and carboxylic acid groups, and corresponds to the general formula

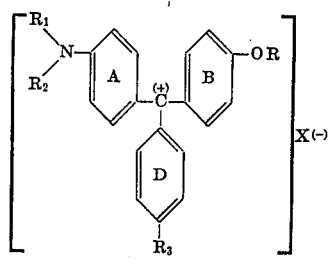

(I)

in which R stands for an alkyl, aralkyl, cycloalkyl or aryl radical; $R_1$ stands for hydrogen or for an alkyl, aralkyl or cycloalkyl radical; $R_2$ stands for an alkyl, aralkyl, cycloalkyl or aryl radical; $R_1$ and $R_2$ together with the nitrogen atom, or $R_1$ or $R_2$ with a carbon atom in the O-position in the ring A may form a heterocyclic ring; $R_3$ stands for hydrogen, an alkyl, aralkyl, aryl, alkoxy, aralkoxy, aryloxy, alkylmercapto or arylmercapto radical, a halogen substituent, a carboxylic acid ester, carbonamide, sulphonamide, cyano, nitro, alkylsulphonyl, aralkylsulphonyl, arylsulphonyl or acyl group; and X stands for the radical of an anion.

The compounds of the formula I which are used in the process of the invention may contain further substituents, with the exception of sulphonic acid and carboxylic acid groups, in the aliphatic, cycloaliphatic and aromatic radicals, including the phenylene radicals A, B and D illustrated in the formula. Suitable substituents are, for example, lower alkyl and alkoxy radicals with one to four carbon atoms; aralkyl such as benzyl; aralkoxy such as benzyloxy; aryl such as phenyl or phenyl radicals substituted by nonionic radicals, e.g., chlorophenyl, methylphenyl, ethylphenyl, nitrophenyl and cyanophenyl; aryloxy groups such as phenyloxy; halogen substituents, especially Cl and Br; carboxylic acid ester groups, especially carboxylic acid methyl ester and ethyl ester groups; optionally N-substituted carbonamide groups, the preferred N-substituents being lower alkyl groups which may, in turn, be substituted, e.g., by Cl, Br and OH; the cyano, nitro or hydroxyl groups; optionally N-substituted amino groups; alkylsulphonyl such as methylsulphonyl and ethylsulphonyl; arylsulphonyl such as benzene-sulphonyl and P-toluene-sulphonyl; acyloxy groups such as acetoxy and propionyloxy; acylamino groups such as formylamino, acetylamino, propionylamino; methylsulphonylamino, benzoylamino and benzene-sulphonylamino groups; and acyl radicals, such as the benzoyl and acetyl radicals.

The rings A, B and/or D may contain further anellated rings, particularly a six-membered monocyclic radical, as for example, in a compound of the formula

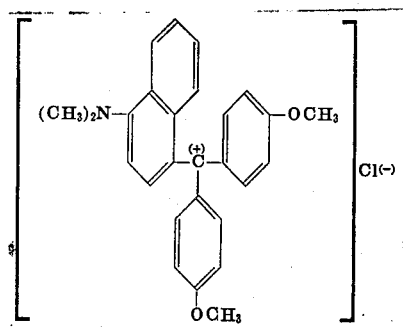

A group of particularly valuable compounds of the general formula (I) for use in the process of the invention corresponds to the formula

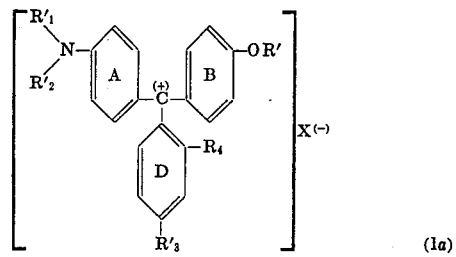

(Ia)

In this formula the symbols R', $R'_1$ and $R'_2$ stand for optionally substituted alkyl radicals with one to four carbon atoms; $R'_1$ and $R'_2$ together with the nitrogen atom, or $R'_1$ or $R'_2$ with a carbon atom in the O-position of the phenylene ring A may form a heterocyclic ring; $R'_3$ stands for hydrogen or for an alkyl or alkoxy radical with one to four carbon atoms; $R_4$ stands for hydrogen or halogen, especially chlorine and bromine, or for a lower alkyl or alkoxy radical; the phenylene radical D is preferably substituted by a further lower alkyl radical; X has the same meaning as in formula I.

Another group of particularly valuable compounds of the general formula I for use in the process of the invention corresponds to the formula

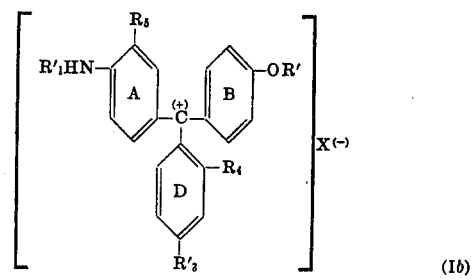

(Ib)

In this formula the symbols R', $R'_1$, $R'_3$, $R_4$ and X have the same meaning as in formula (Ia), and $R_5$ stands for hydrogen or a lower alkyl radical.

The compounds of the general formula I are obtainable by condensing, in the presence of acidic condensation agents, benzophenones of the general formula

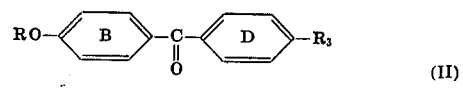

(II)

in which R and $R_3$ have the same meaning as given in respect of the formula I, or as given in respect of R' and $R'_3$ in the formulas Ia and Ib, and the rings B and D may be further substituted as hereinbefore described, with aromatic amines of the formula

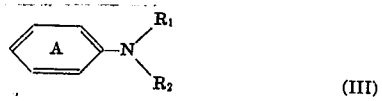

(III)

in which $R_1$ and $R_2$ have the same meanings as given in respect of formula I, or as given in respect of $R'_1$ and $R'_2$ in formula Ia, or $R_1$ has the meaning of $R'_1$ in formula Ia and $R_2$ is hydrogen. The ring A may be further substituted as hereinbefore described. Starting components are selected which are free from sulphonic acid and carboxylic acid groups.

Examples of benzophenones which may be used in the production of the compounds for use according to the present invention are the following:

4-methoxybenzophenone, 4-ethoxybenzophenone, 4-methoxy-2-methyl-benzophenone, 4-phenoxybenzopheneone, 4-methoxy-4'-methylbenzophenone, 4-methoxy-2',4'-dimethylbenzophenone, 4-methoxy-2',5'-dimethylbenzophenone, 4-methoxy-3',4'-dimethylbenzophenone, 4-methoxy-2',4',5'-trimethylbenzophenone, 4-methoxy-2'-chloro-benzophenone, 4-methoxy-3'-chlorobenzophenone, 4-methoxy-4'-chlorobenzophenone, 4-methoxy-2',5'-dichlorobenzophenone, 2,4-dimethoxybenzophenone, 2,4-dimethoxy-2',5'-dichlorobenzophenone, 2,4-dimethoxy-2'-chlorobenzophenone, 2,4-dimethoxy-4'-chlorobenzophenone, 2,4-dimethoxy-3'-chlorobenzophenone, 4-methoxy-2',4'-diisopropyl-benzophenone, 4-methoxy-2',5'-diisopropylbenzophenone, 2,4-dimethoxy-2'-bromobenzophenone, 4-methoxy-2,4'-dimethylbenzophenone, 4-methoxy-2-methyl-2'-chlorobenzophenone, 4-methoxy-2-methyl-2'-bromobenzophenone, 4-methoxy-2'-bromobenzophenone, 4,4'-dimethoxybenzophenone, 4,4'-diethoxybenzophenone, 2,4,4'-trimethoxybenzophenone, 4-methoxy-4'-ethoxybenzophenone, 4-ethoxy-4'-propoxybenzophenone, 4,4'-dimethoxy-2-methylbenzophenone, 4,4'-dimethoxy-2-chloro-5-methylbenzophenone, 4,4'-di-n-propoxybenzophenone, 4,4'-dimethoxy-3,3'-dimethylbenzophenone, 4-methoxy-4'-phenoxybenzophenone, 4,4'-di-n-butoxybenzophenone, 4,4'-dimethoxy-3,3'-diethylbenzophenone, 4,4'-dimethoxy-3,3'-dichlorobenzophenone, 3,4,4'-trimethoxybenzophenone, 4,4'-dimethoxy-3,5-dimethylbenzophenone, 4,4'-dimethoxy-3-methyl-5-chlorobenzophenone, 4-methoxy-4'-isopropoxybenzophenone, 4,4'-dimethoxy-3-isopropylbenzophenone, 4,4'-dimethoxy-2-chlorobenzophenone, 4,4'-dimethoxy-3-chlorobenzophenone, 4,4'-dimethoxy-2-methyl-5-chlorobenzophenone, 4,4'-dimethoxy-2-chloro-3-methylbenzophenone, 4,4'-dimethoxy-3-methylbenzophenone, 4,4'-dimethoxy-2,5-dimethylbenzophenone, 2,4'-dimethoxybenzophenone, 3,4'-dimethoxybenzophenone, 4,2'-dimethoxy-2-chloro-3-methylbenzophenone, 3-methoxy-4'-propoxybenzophenone, 4,4'-dimethoxy-2,3-dimethylbenzophenone, 4-methoxy-4'-isopropoxybenzophenone, 4-methoxy-4'-butoxybenzophenone, 4,4'-dimethoxy-3,5-diisopropylbenzophenone, 4,2'-dimethoxy-3-chlorobenzophenone, 4,2'-dimethoxy-2-chlorobenzophenone, 4,2'-dimethoxy-2-methyl-5-chlorobenzophenone, 4,2'-dimethoxy-2-chloro-5-methylbenzophenone, 4,3'-dimethoxy-2-methylbenzophenone, 4-methoxy-4'-propoxy-2-methylbenzophenone, 4-ethoxy-2'-methoxybenzophenone, 4-ethoxy-3'-methoxybenzophenone, 4,2',5'4-trimethoxybenzophenone, 4,3,3'-trimethoxybenzophenone, 4,3,2'-trimethoxybenzophenone, 4,2'-dimethoxy-3-methylbenzophenone, 4,2'-dimethoxy-2-methylbenzophenone, 4,2'-dimethoxy-5'-methylbenzophenone, 4-propoxy-2'-methoxybenzophenone, 4-methoxy-4'-methylmercaptobenzophenone, 4-ethoxy-2-methylbenzophenone, 4-methoxy-2-methyl-6-ethylbenzophenone, 4-n-butoxy-2-methylbenzophenone, 4-methoxy-3'-methylbenzophenone, 4-methoxy-4'-tert.-butylbenzophenone, 4-ethoxy-3'-methylbenzophenone, 4-methoxy-2,3'-dimethylbenzophenone, 4-methoxy-2-methyl-4'-tert.-butylbenzophenone, 4-methoxyy-2'-methylbenzophenone, 4-ethoxy-2'-methylbenzophenone, 4-n-propoxy-2'-methylbenzophenone, 4-isopropoxy-2'-methylbenzophenone, 4-n-butoxy-2'-methylbenzophenone, 4-methoxy-2,2'-dimethylbenzophenone, 2,4-dimethoxy-3'-methylbenzophenone, 4-methoxy-4'-phenoxybenzophenone, 2-methoxy-1-(4'-methoxybenzoyl)-naphthalene, 4,4'-dimethoxy-2-methyl-6-ethylbenzophenone, 4-methoxy-4'-cyclohexylbenzophenone, 4,4'-dicyclohexyloxybenzophenone and 2,4,4'-triethoxybenzophenone.

Examples of aromatic amines which are suitable for condensation with benzophenones for the production of the compounds for use according to the present invention are as follows:

dimethylaniline, diethylaniline, di-n-propylaniline, di-n-butylaniline, N-methyl-N-$\beta$-hydroxyethylaniline, N-butyl-N-$\beta$-hydroxyethylaniline, N,N-dihydroxyethylaniline, N,N-di-$\beta$-chloro-ethylaniline, N-methyl-N-$\beta$-cyanoethylaniline, N-methyl-N-$\beta$-chloro-ethylaniline, N-ethyl-N-$\beta$-chloroethylaniline, N-butyl-N-$\beta$-chloroethylaniline, N-ethyl-N-$\beta$-dimethylaminoethylaniline, N,N-bis-$\alpha$,$\beta$-dihydroxypropylaniline, N-methyl-N-benzylaniline, N-ethyl-N-benzylaniline, N,N-dibenzylaniline, N-methyldiphenylamine, N-methyl-N-(4-ethoxyphenyl)-aniline, N-phenylmorpholine, 2-methyl-N,N-dimethylaniline, 3-methyl-N,N-dimethylaniline, 3-chloro-N,N-dimethylaniline, 3-chloro-N,N-diethylaniline, 3-methyl-N-ethyl-N-benzylaniline, 3-methyl-N,N-dibenzylaniline, 3-methyl-N-ethyl-N-$\beta$-hydroxyethylaniline, 3-methyl-N-ethyl-N-$\beta$-dimethylaminoethylaniline, 3-methyl-N,N-dihydroxyethylaniline, 3-nitro-N,N-diethylaniline, 3-hydroxy-N,N-dimethylaniline, 3-hydroxy-N,N-diethylaniline, 3-ethoxy-N,N-diethylaniline, 2-methyl-5-hydroxy-N,N-dimethylaniline N,N-diisopropylaniline, 3-methoxy-N,N-dimethylaniline, 3-methoxy-N,N-diethylaniline, 2-methyl-5-methoxy-N,N-dimethylaniline, N-methyl-N-$\beta$-methoxyethylaniline, N,N-di-$\beta$-methoxyethylaniline, N-methyl-N-isobutylaniline, N-methyl-N-isopropylaniline, N-ethyl-N-isopropylaniline, N-isopropyl-N-isobutylaniline, N-methyl-N-ethylaniline, N-methyl-N-propylaniline, N-ethyl-N-propylaniline, N-propyl-N-isopropylaniline, 1-dimethylaminonaphthalene, 1-diethylaminonaphthalene, N-ethyl-N-$\beta$-hydroxyethylaniline, 3-methyl-N-ethyl-N-$\beta$-chloroethylaniline, 3-methyl-N-ethyl-N-$\beta$-cyanoethylaniline, 3-ethoxy-N,N-diethylaniline, 2-ethoxy-N-$\beta$-cyanoethylaniline, 2-methyl-N-$\beta$-cyanoethylaniline, 2-methyl-N-benzylaniline, 2-methyl-N-methylaniline, 2-methyl-N-ethylaniline, N-butylaniline, N-isobutylaniline, N-$\beta$-cyanoethylaniline, N-$\beta$-chloroethylaniline, N-benzylaniline, N-$\beta$-cyanoethyl-2-ethylaniline, 2,3-dimethyl-N-$\beta$-cyanoethylaniline, 2,5-dimethyl-N-$\beta$-cyanoethylaniline, 2-hydroxy-N-$\beta$-cyanoethylaniline, 3-methyl-N-ethylaniline, 3-methyl-N-butylaniline, N-$\beta$-hydroxyethylaniline, tetrahydroquinoline, 2-methyl-2,3-dihydroindole, 1,2,3,3-tetramethylindoline, 1-phenyl-3-methylpyrazoline, 1,3-dimethylpyrazoline, 1,3-diphenylpyrazoline, 2,3-dimethyl-N-methylaniline, 2,5-dimethyl-N-methylaniline, N-methyl-N-cyclohexylaniline, N-methyldiphenylamine, N-methyl-N-(4-methylphenyl)-aniline, N-methyl-N-(4-chlorophenyl)-aniline, N-methyl-N-(4-bromophenyl)-aniline, 2-methyl-N,N-dimethylaniline, N-methyl-N-(3-methyl-phenyl)-aniline and N-methyl-N-(3-methoxy-phenyl)-aniline.

Suitable acidic condensation agents are, for example, phosphorus oxychloride, phosphorus pentoxide, thionyl chloride, phosgene, zinc chloride, aluminum chloride, tin chloride, sulphuric acid or phosphoric acid.

The reaction can be carried out in the presence or absence of an inert solvent. Suitable solvents are, for example, chlorobenzene, O-dichlorobenzene, toluene, xylene, benzene, ligroin, dioxan, chclohexane, carbon tetrachloride, chloroform or ethylene chloride.

In general, the reaction is carried out at an elevated temperature, for example at 30°–160° C., preferably at 40°–120° C.

According to another process, the compounds for use according to the present invention, can be prepared by oxidation of the corresponding leuco compounds which, of course, have the same formulas as I, Ia and Ib, subject to the modification that

is replaced by

The oxidation is preferably carried out by means of suitable dehydrogenating or oxidizing agents, preferably in an acidic medium, for example, in acetic acid, dilute sulphuric acid, dilute hydrochloric acid or in mixtures of these acids. Water-miscible organic solvents, such as alcohol, dimethyl formamide or acetonitrile, may be added to improve the solubility. Suitable dehydrogenating or oxidizing agents are the agents usually applied in triphenyl-methane chemistry, for example, iron (III) or copper (II) salts, their complex compounds, alkali metal dichromates, lead (IV) oxide and its salts, such as lead tetracetate, nitrous acid, peroxide compounds, such as potassium persulphate, hydrogen peroxide, as well as atmospheric oxygen, possibly with the addition of oxygen-transferring catalysts, such as metal ions.

The leuco compounds to be oxidized can be prepared by condensing benzohydrol compounds having the same formula as formula (II) subject to the modification that

is replaced by

, with the various aromatic amines that have hereinbefore been described.

Suitable benzohydrol compounds are, for example: 4-methoxy-benzohydrol, 2,4′-dimethoxybenzohydrol, 4-ethoxybenzohydrol, 2-methoxy-4′-ethoxybenzohydrol, 4-n-propoxybenzohydrol, 2-methoxy-4′-n-propoxybenzohydrol, 4-methoxy-2,2′-dimethylbenzohydrol, 4-methoxy-3,3′-dimethylbenzohydrol, 4,4′-diethoxybenzohydrol, 4,4′-di-n-propoxybenzohydrol, 4,4′-diisopropoxybenzohydrol, 4,4′-di-n-butoxybenzohydrol, 4,4′-dimethoxybenzohydrol, 4,4′-dimethoxy-3,3′-dimethylbenzohydrol, 4,4′-dimethoxy-2,2′-dimethylbenzohydrol and 4,4′-dimethoxy-2-chlorobenzohydrol.

The anionic radicals $X^-$ may be inorganic as well as organic ions; examples are $Cl^-$, $Br^-$, $I^-$, $Ch_3SO_4^-$, $C_2H_5SO_4^-$, p-toluene-sulphonate, $HSO_4^-$, benzene-sulphonate, p-chlorobenzene-sulphonate, phosphate, acetate, formate, propionate, oxalate, lactate, maleinate, crotonate, tartrate, citrate, $NO_3^-$, perchlorate, $ZnCl_3^-$. The type of anionic radical is of no importance for the properties of the dyestuffs, provided they are substantially colorless radicals which do not impair the solubility of the dyestuffs in an undesirable manner.

Materials suitable for being dyed or printed according to the invention are primarily flocks, fibers, filaments, ribbons, and woven or knitted fabrics, consisting completely or in part of acrylonitrile polymers and copolymers, as.-dicyanoethylene, or acid-modified aromatic polyesters.

Acrylonitrile copolymers are, for example, copolymers of acrylonitrile with other vinyl compounds, such as vinyl chloride, vinylidene chloride, vinyl fluoride, vinyl acetate, vinyl pyridine, vinyl imidazole, vinyl alcohol, acrylic and methacrylic acid esters and amides, and as.-dicyanoethylene.

Acid-modified aromatic polyesters are, for example, polycondensation products of sulpho-terephthalic acid and ethylene glycol, i.e., polyethylene glycol terephthalates containing sulphonic acid groups (type DACRON 64 of E. I. du Pont de Nemours and Company), such as are described in Belgian Pat. No. 549,179 and U.S. Pat. No. 2,893,816. (DACRON is a registered trademark.) Acid-modified superpolyamides are, for example, sulpho group-containing superpolyamides (type Dye I of Monsanto Company and BCF Nylon Carpet Yarn type 844 of E. I. du Pont de Nemours and Company).

Dyeing can be carried out from a weakly acidic bath; the material is expediently introduced into the dyebath at 40°–60° C. and dyeing is then performed at boiling temperature. It is also possible to dye under pressure at temperatures above 100° C. Moreover, the dyestuffs can be added to spinning solutions serving for the production of fibers containing polyacrylonitrile, or they can be applied to the unstretched fiber. It is accordingly to be understood that the expression "-dyeing of shaped materials" as used herein includes the dyeing of what will be used to produce the shaped material.

The dyeings which can be obtained according to the invention are characterized by vivid, predominantly red and violet shades of very good fastness to light and washing. The good affinity of the dyestuffs and their good fastness to cross-dyeing in an acetic acid and sulphuric acid medium should be emphasized.

The dyestuffs can be used individually or in mixtures. When materials of polyacrylonitrile are dyed, mixtures frequently show a higher strength of color.

With anionic precipitation agents, such as alumina, tannin, phosphotungstic (molybdic) acids, and dyestuffs form pigments which are fast to light and can be used to advantage in printing.

EXAMPLE 1

Polyacrylonitrile fibers are introduced at 40° C. in a liquor ratio of 1:40 into an aqueous bath containing, per litre, 0.75 g. of 30 percent acetic acid, 0.38 g. sodium acetate and 0.3 g. of the triphenyl-methane dyestuff of the formula

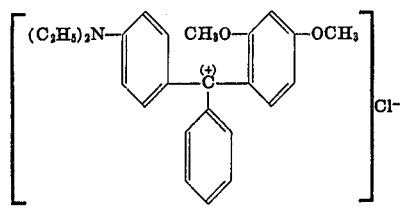

in the form of the zinc chloride double salt the preparation of which is described below. The bath is heated to boiling temperature within 20–30 minutes and kept at this temperature for 30–60 minutes. The polyacrylonitrile fibers are subsequently rinsed and dried. A bluish red dyeing of very good fastness to light is obtained.

The dyestuff was obtained in the following way:

24.2 parts by weight 2,4-dimethoxy-benzophenone are added to 35 parts by weight phosphorus oxychloride, and 14.9 parts by weight diethyl-aniline are subsequently introduced whereupon a slight rise of temperature occurs. Fifteen parts by weight phosphorus pentoxide are then added and the reaction mixture is slowly heated to 100° C. After stirring for 5 hours, the warm melt is poured into 800 parts by weight of water and the dark-red solution is mixed with 10 parts by weight of a 50 percent aqueous zinc chloride solution. After further stirring for several hours, the dyestuff of the above formula crystallizes. It is filtered off with suction and further purified by dissolving it in 10 percent acetic acid and precipitating with a 50 percent aqueous zinc chloride solution.

EXAMPLE 2

Acid-modified polyglycol terephthalate fibers of the type DACRON 64 (du Pont) as are described in Belgian Pat. No. 549,179 and in U.S. Pat. No. 2,893,816 are introduced at 20°

C. in a liquor ratio of 1:40 into an aqueous bath which contains, per liter, 3 g. sodium sulphate, 0.5 to 2 g. of an oleyl polyglycol ether (50 mol ethylene oxide), 2.5 to 5 g. diphenyl and 0.3 g. of the dyestuff of the formula of Example 1, and which has been adjusted to a pH value of 4.5 to 5.5 with acetic acid. The bath is heated to 98° C. within 30 minutes and kept at this temperature for 60 minutes. The fibers are subsequently rinsed and dried. A bluish red dyeing of very good fastness properties is obtained. (DACRON is a registered trademark.)

A similar result is obtained on acid-modified superpolyamide fibers, such as on "Dye I"(Monsanto).

EXAMPLE 3

Acid-modified polyglycol terephthalate fibers as in Example 2 are introduced at 20° C. in a liquor ratio of 1:40 into an aqueous bath which contains, per liter, 6 to 10 g. sodium sulphate, 0.5 to 1 g. oleyl polyglycol ether (50 mol ethylene oxide), 0 to 15 g. dimethyl-benzyl-dodecyl ammonium chloride and 0.3 g. of the dyestuff of the formula of Example 1, and which has been adjusted to pH 4 to 5 with acetic acid. The bath is heated to 120° C. within 30 minutes and kept at this temperature for 60 minutes. The fibers are subsequently rinsed and dried. A bluish red dyeing of very good fastness properties is obtained.

EXAMPLE 4

A fabric of polyacrylonitrile is printed with a printing paste prepared in the following way:

Three hundred parts by weight of hot water are poured over 30 parts by weight of the triphenyl-methane dyestuff of the formula of Example 1, 50 parts by weight thiodiethylene glycol, 30 parts by weight cyclohexanol and 30 parts by weight of 30 percent acetic acid, and the resultant solution is added to 500 parts by weight of crystal gum (gum arabic as thickening agent). Finally, 30 parts by weight of a zinc nitrate solution are added. The print obtained is dried, steamed for 30 minutes and subsequently rinsed. A bluish red print of very good fastness properties is obtained.

EXAMPLE 5

A stock solution prepared from 15 parts by weight of the dyestuff mentioned in Example 1, 15 parts by weight polyacrylonitrile and 70 parts by weight dimethyl formamide is added to a conventional spinning solution of polyacrylonitrile, and this is spun in known manner. A bluish red dyeing of very good fastness properties is obtained.

Similar valuable dyeings are obtained with dyestuffs which have been prepared in the manner described above from the benzophenones and aromatic amines set out in the following Table.

| Dyestuff from 4-methoxybenzophenone and | Shade on polyacrylonitrile |
| --- | --- |
| dimethylaniline | bluish red |
| diethylaniline | bluish red |
| N-methyl-N-β-cyanoethylaniline | strongly bluish red |
| N-ethyl-N-β-hydroxyethylaniline | strongly bluish red |
| di-n-propylaniline | strongly bluish red |
| N-ethyl-N-benzylaniline | strongly bluish red |
| 3-methoxy-N,N-diethylaniline | dull red |
| 3-methyl-N,N-dimethylaniline | bluish Bordeaux |
| 3-methyl-N-ethyl-N-benzylaniline | reddish violet |
| N-butyl-N-β-chloroethylaniline | ruby |
| 2-methyl-N,N-dimethylaniline | bluish red |
| N,N-diisopropylaniline | red |
| N-methyldiphenylamine | reddish violet |
| 1-dimethylaminonaphthalene | bluish red |
| N-ethyl-N-dimethylaminoethylaniline | bluish pink |
| N,N-di-β-chloroethylaniline | strongly bluish red |
| N-ethyl-N-β-chloroethylaniline | strongly bluish red |
| N-methyl-2-methylaniline | red |
| N-ethyl-2-methylaniline | yellowish red |
| N-isobutylaniline | red |
| N-butyl-3-methylaniline | bluish Bordeaux |

| Dyestuff from 4-methoxybenzophenone and | Shade on polyacrylonitrile |
| --- | --- |
| N-benzyl-2-methylaniline | bluish red |
| N-β-cyanoethyl-2-ethoxyaniline | ruby |
| N-β-cyanoethyl-2-methylaniline | red |
| N-β-cyanoethyl-2-ethylaniline | red |
| N-phenylmorpholine | ruby |
| 1,2,3,3-tetramethylindoline | red |
| 1-phenyl-3-methylpyrazoline | reddish violet |
| 1,3-diphenylpyrazoline | reddish blue |

| Dyestuff from 4-ethoxybenzophenone and | Shade on polyacrylonitrile |
| --- | --- |
| dimethylaniline | bluish red |
| diethylaniline | bluish red |
| N-methyl-N-β-cyanoethylaniline | strongly bluish red |
| N-ethyl-N-β-hydroxyethylaniline | strongly bluish red |
| 3-methyl-N-ethyl-N-β-chloroethylaniline | red-violet |
| 3-methyl-N-ethyl-N-β-cyanoethylaniline | reddish violet |
| di-n-propylaniline | bluish red |
| N-ethyl-N-benzylaniline | ruby |
| 3-methoxy-N,N-diethylaniline | bluish red |
| 3-methyl-N,N-dimethylaniline | strongly bluish red |
| N,N-diisopropylaniline | red |
| N-methyldiphenylamine | red-violet |
| N-methyl-N-4-ethoxyphenylaniline | reddish violet |
| 1-dimethylaminonaphthalene | strongly bluish red |
| 2-ethoxy-N-β-cyanoethylaniline | ruby |
| 2-methyl-N-β-cyanoethylaniline | bluish red |
| N-phenylmorpholine | ruby |
| 1,2,3,3-tetramethylindoline | bluish red |
| 1-phenyl-3-methylpyrazoline | reddish violet |

| Dyestuff from 4-phenoxybenzophenone and | Shade on polyacrylonitrile |
| --- | --- |
| dimethylaniline | yellowish red |
| 3-methyl-N,N-dimethylaniline | reddish Bordeaux |
| N-methyl-N-4-ethoxyphenylaniline | reddish violet |
| 2-methoxy-N-cyanoethylaniline | bluish red |
| 1,2,3,3-tetramethylindoline | yellowish red |
| 1-phenyl-3-methylpyrazoline | strongly bluish Bordeaux |

| Dyestuff from 2-methyl-4-methoxy benzophenone and | Shade on polyacrylonitrile |
| --- | --- |
| dimethylaniline | strongly yellowish red |
| diethylaniline | strongly yellowish red |
| di-n-propylaniline | yellowish red |
| N-methyl-N-β-hydroxyethylaniline | red |
| N-ethyl-N-β-hydroxyethylaniline | red |
| N-butyl-N-β-chloroethylaniline | red |
| N-methyl-N-β-cyanoethylaniline | red |
| N-ethyl-N-benzylaniline | red |
| 3-methyl-N,N-dimethylaniline | Bordeaux, reddish |
| 3-methyl-N-ethyl-N-benzylaniline | Bordeaux |
| 3-methyl-N-ethyl-N-β-cyanoethylaniline | Bordeaux |
| 3-methoxy-N,N-diethylaniline | strongly yellowish red |
| 2-methyl-N-methylaniline | yellowish scarlet |
| 2-methyl-N-ethylaniline | yellowish scarlet |
| 2-methyl-N-cyanoethylaniline | strongly yellowish red |
| N-β-hydroxyethylaniline | yellowish red |
| 2-methyl-N-benzylaniline | strongly yellowish red |
| 2-ethyl-N-β-cyanoethylaniline | yellowish red |
| 2,3-dimethyl-N-β-cyanoethylaniline | ruby |

| Dyestuff from 2-methyl-4-methoxy benzophenone and | Shade on polyacrylonitrile |
| --- | --- |
| tetrahydroquinoline | reddish orange |
| 1,2,3,3-tetramethylindoline | strongly yellowish red |
| N-phenylmorpholine | red |
| 1-phenyl-3-methylpyrazoline | Bordeaux |
| 1,3-diphenylpyrazoline | strongly reddish blue |
| N-ethyl-N-β-dimethylamino ethylaniline | bluish red |
| N-n-propyl-o-toluidine | yellowish scarlet |
| N-i-propyl-o-toluidine | yellowish scarlet |
| N-n-butyl-o-toluidine | strongly yellowish red |
| α-anilino-isobutyric acid-methylester | strongly yellowish red |

| Dyestuff from 2-methyl-4-ethoxy benzophenone and | Shade on polyacrylonitrile |
| --- | --- |
| dimethylaniline | yellowish red |
| diethylaniline | yellowish red |
| di-n-propylaniline | red |
| N-methyl-N-β-cyanoethylaniline | somewhat bluish red |
| N-methyl-N-β-hydroxyethylaniline | red |
| N-ethyl-N-benzylaniline | yellowish red |
| 3-methoxy-N,N-diethylaniline | strongly yellowish red |
| 2-methyl-N-methylaniline | scarlet |
| 2-methyl-N-ethylaniline | scarlet |

| 2-methyl-N-β-cyanoethylaniline | bluish scarlet |
| N-isobutylaniline | reddish orange |
| 2-ethyl-N-β-cyanoethylaniline | strongly yellowish red |
| 2-methyl-N-benzylaniline | scarlet |
| 1,2,3,3-tetramethylindoline | strongly yellowish red |
| N-phenylmorpholine | red |
| α-anilino-isobutyric acid-methylester | clear somewhat yellowish red |

| Dyestuff from 2-methyl-4-butoxy benzophenone and | Shade on polyacrylonitrile |
|---|---|
| dimethylaniline | yellowish red |
| diethylaniline | yellowish red |

| Dyestuff from 2-methyl-4-butoxy-benzophenone and | Shade on polyacrylonitrile |
|---|---|
| di-n-propylaniline | red |
| N-methyl-N-β-cyanoethylaniline | bluish red |
| N-methyl-N-β-hydroxyethylaniline | red |
| N-ethyl-N-benzylaniline | somewhat bluish red |
| 2-methyl-N-methylaniline | reddish orange |
| 2-methyl-N-ethylaniline | yellowish scarlet |
| 2-methyl-N-β-cyanoethylaniline | strongly yellowish red |
| 2-ethyl-N-β-cyanoethylaniline | yellowish red |
| N-isobutylaniline | strongly yellowish red |
| 1,2,3,3-tetramethylindoline | strongly yellowish red |
| N-phenylmorpholine | red |
| 3-ethoxy-N,N-diethylaniline | strongly yellowish red |

| Dyestuff from 2,4-dimethoxybenzophenone and | Shade on polyacrylonitrile |
|---|---|
| dimethylaniline | bluish red |
| di-n-propylaniline | strongly bluish red |
| N-methyl-N-β-cyanoethylaniline | Bordeaux |
| N-methyl-N-β-hydroxyethylaniline | bluish red |
| 3-methyl-N,N-dimethylaniline | strongly bluish red |
| 2-methyl-N-ethylaniline | red |
| 2-methyl-N-β-cyanoethylaniline | bluish red |
| 2-methyl-N-benzylaniline | strongly bluish red |
| 1,2,3,3-tetramethylindoline | red |
| N-phenylmorpholine | Bordeaux |
| 1,3-diphenylpyrazoline | reddish dark-blue |

| Dyestuff from 4-methoxy-2'-chlorobenzophenone and | Shade on polyacrylonitrile |
|---|---|
| dimethylaniline | yellowish red |
| diethylaniline | yellowish red |
| N-ethyl-N-chloroethylaniline | red |
| N-butyl-N-β-chloroethylaniline | somewhat bluish red |
| N-methyldiphenylamine | red-violet |
| 3-methyl-N,N-dimethylaniline | reddish Bordeaux |
| 3-methyl-N-ethylaniline | bluish red |
| di-n-propylaniline | bluish red |
| N-methyl-N-β-hydroxyethylaniline | bluish red |
| N-methyl-N-β-cyanoethylaniline | strongly bluish red |
| 3-ethoxy-N,N-diethylaniline | red |
| N-ethyl-N-benzylaniline | strongly bluish red |
| N-butylaniline | scarlet |
| N-isobutylaniline | strongly yellowish red |
| N-β-cyanoethylaniline | yellowish red |
| 2-methyl-N-methylaniline | strongly yellowish red |
| 2-methyl-N-ethylaniline | strongly yellowish red |
| 2-methyl-N-β-cyanoethylaniline | bluish red |
| 2-ethyl-N-β-cyanoethylaniline | red |
| 2-methyl-N-benzylaniline | red |
| 1,2,3,3-tetramethylindoline | strongly yellowish red |
| N-phenylmorpholine | strongly bluish red |
| 1,3-diphenylpyrazoline | bluish violet |
| 1-phenyl-3-methylpyrazoline | bluish Bordeaux |
| α-anilino-isobutyric acid-methylester | clear red |
| N-n-butyl-o-toluidine | strongly yellowish red |
| N-ethyl-2-chloroaniline | strongly bluish red |
| N-ethyl-o-anisidine | red |

| Dyestuff from 4-ethoxy-2'-chlorobenzophenone and | Shade on polyacrylonitrile |
|---|---|
| dimethylaniline | red |

| Dyestuff from 4-ethoxy-2'-chlorobenzophenone and | Shade on polyacrylonitrile |
|---|---|
| diethylaniline | bluish red |
| di-n-propylaniline | bluish red |
| N-methyl-N-hydroxyethylaniline | strongly bluish red |
| N-methyl-N-cyanoethylaniline | strongly bluish red |
| N-ethyl-N-benzylaniline | strongly bluish red |
| 3-ethoxy-N,N-diethylaniline | strongly yellowish red |
| N-butylaniline | strongly yellowish red |
| N-isobutylaniline | strongly yellowish red |
| N-β-cyanoethylaniline | red |
| 2-methyl-N-methylaniline | strongly yellowish red |
| 2-methyl-N-ethylaniline | strongly yellowish red |
| 2-methyl-N-benzylaniline | bluish red |
| 2-methyl-N-β-cyanoethylaniline | red |
| 2-ethyl-N-β-cyanoethylaniline | red |
| 1,2,3,3-tetramethylindoline | strongly yellowish red |
| N-phenylmorpholine | strongly bluish red |
| 1,3-diphenylpyrazoline | strongly bluish violet |
| 1-phenyl-3-methylpyrazoline | Bordeaux |

| Dyestuff from 4-methoxy-4'-chlorobenzophenone and | Shade on polyacrylonitrile |
|---|---|
| dimethylaniline | bluish red |
| diethylaniline | bluish red |

| Dyestuff from 4-methoxy-2',5'-dichlorobenzophenone and | Shade on polyacrylonitrile |
|---|---|
| dimethylaniline | yellowish red |

| Dyestuff from 4-methoxy-2',5'-dichlorobenzophenone and | Shade on polyacrylonitrile |
|---|---|
| diethylaniline | yellowish red |

| Dyestuff from 4-methoxy-2'-bromobenzophenone and | Shade on polyacrylonitrile |
|---|---|
| dimethylaniline | yellowish red |
| diethylaniline | yellowish red |
| N-methyl-N-β-chloroethylaniline | somewhat bluish red |
| di-n-propylaniline | red |
| N-ethyl-N-β-dimethylamino-ethylaniline | strongly bluish red |
| n-butylaniline | clear strongly yellowish red |
| isobutylaniline | strongly yellowish red |
| N-cyanoethylaniline | somewhat yellowish red |
| N-methyl-o-toluidine | clear strongly yellowish red |
| N-ethyl-o-toluidine | clear strongly yellowish red |
| N-n-butyl-o-toluidine | strongly yellowish red |
| N-cyanoethyl-o-toluidine | red |
| N-cyanoethyl-2-ethylaniline | red |

| Dyestuff from 4-methoxy-2'-methyl-benzophenone and | Shade on polyacrylonitrile |
|---|---|
| dimethylaniline | yellowish red |
| diethylaniline | yellowish red |
| di-n-propylaniline | red |
| N-methyl-N-β-cyanoethylaniline | bluish red |
| N-methyl-N-β-hydroxyethylaniline | bluish red |
| N-butyl-N-β-chloroethylaniline | bluish red |
| N-ethyl-N-benzylaniline | bluish red |
| 3-methyl-N,N-dimethylaniline | Bordeaux |
| 3-methyl-N-ethyl-N-β-chloro-ethylaniline | bluish Bordeaux |
| 3-methyl-N-ethyl-N-β-cyanoethylaniline | bluish Bordeaux |
| diphenylamine | red-violet |
| 3-ethoxy-N,N-diethylaniline | strongly yellowish red |
| N-n-butylaniline | yellowish scarlet |
| N-isobutylaniline | scarlet |
| N-benzylaniline | scarlet |
| 2-methyl-N-methylaniline | scarlet |
| 2-methyl-N-ethylaniline | scarlet |
| 2-methyl-N-benzylaniline | strongly bluish scarlet |
| 2-methyl-N-β-cyanoethylaniline | bluish scarlet |
| 2-ethyl-N-β-cyanoethylaniline | bluish scarlet |
| 2,5-dimethyl-N-β-cyanoethylaniline | bluish Bordeaux |
| 2-methyl-2,3-dihydroindole | yellowish scarlet |
| 1,2,3,3-tetramethylindoline | strongly yellowish red |
| N-phenylmorpholine | bluish red |
| 1-phenyl-3-methylpyrazoline | strongly bluish Bordeaux |
| 1,3-diphenylpyrazoline | reddish blue |
| N-methyldiphenylamine | bluish ruby |
| N-methyl-4-ethoxyphenylaniline | strongly bluish Bordeaux |
| N-ethyl-N-β-dimethylamino-ethylaniline | bluish pink |
| N-n-propyl-o-toluidine | yellowish red |
| N-i-propyl-o-toluidine | strongly yellowish red |

Page 9, 10 — list continues on page 10:

| | Shade on polyacrylonitrile |
|---|---|
| N-methyl-N-β-hydroxyethylaniline | strongly bluish red |
| N-methyl-N-β-cyanoethylaniline | strongly bluish red |
| N-ethyl-N-benzylaniline | strongly bluish red |
| 3-ethoxy-N,N-diethylaniline | strongly yellowish red |
| N-butylaniline | strongly yellowish red |
| N-isobutylaniline | strongly yellowish red |
| N-β-cyanoethylaniline | red |
| 2-methyl-N-methylaniline | strongly yellowish red |
| 2-methyl-N-ethylaniline | strongly yellowish red |
| 2-methyl-N-benzylaniline | bluish red |
| 2-methyl-N-β-cyanoethylaniline | red |
| 2-ethyl-N-β-cyanoethylaniline | red |
| 1,2,3,3-tetramethylindoline | strongly yellowish red |
| N-phenylmorpholine | strongly bluish red |
| 1,3-diphenylpyrazoline | strongly bluish violet |
| 1-phenyl-3-methylpyrazoline | Bordeaux |

| Dyestuff from 4-ethoxy-2'-methyl-benzophenone and | Shade on polyacrylonitrile |
|---|---|
| N-n-butyl-o-toluidine | strongly yellowish red |
| N-ethyl-2-ethylaniline | strongly yellowish red |
| α-anilino-isobutyric acid-methylester | clear red |
| N-ethyl-2-chloroaniline | bluish red |
| N-ethyl-o-anisidine | red |
| N-cyanoethyl-o-anisidine | ruby |
| 2-methylaminobenzoic acid-methylester | red |

| Dyestuff from 4-ethoxy-2'-methyl-benzophenone and | Shade on polyacrylonitrile |
|---|---|
| dimethylaniline | yellowish red |
| diethylaniline | yellowish red |
| di-n-propylaniline | somewhat bluish red |
| N-methyl-N-β-cyanoethylaniline | strongly bluish red |
| N-methyl-N-β-hydroxyethylaniline | strongly bluish red |
| N-butyl-N-β-chloroethylaniline | strongly bluish red |
| N-ethyl-N-benzylaniline | strongly bluish red |
| 3-methyl-N,N-dimethylaniline | bluish ruby |
| 3-methyl-N-ethyl-N-β-chloroethylaniline | bluish Bordeaux |
| 3-methyl-N-ethyl-N-β-cyanoethylaniline | bluish Bordeaux |
| 3-ethoxy-N,N-diethylaniline | strongly yellowish red |
| N-n-butylaniline | scarlet |
| N-benzylaniline | bluish scarlet |
| 2-methyl-N-methylaniline | scarlet |
| 2-methyl-N-ethylaniline | scarlet |
| 2-methyl-N-benzylaniline | red |
| 2-methyl-N-β-cyanoethylaniline | red |
| 2-ethyl-N-β-cyanoethylaniline | red |
| 2,5-dimethyl-N-β-cyanoethylaniline | bluish ruby |
| 2-methyl-2,3-dihydroindole | reddish orange |
| 1,2,3,3-tetramethylindoline | strongly yellowish red |
| N-phenylmorpholine | strongly bluish red |
| 1-phenyl-3-methylpyrazoline | strongly bluish Bordeaux |
| 1,3-diphenylpyrazoline | strongly reddish violet |
| N-methyldiphenylamine | bluish Bordeaux |
| N-ethyl-N-β-dimethylaminoethylaniline | strongly bluish red |
| N-i-propyl-o-toluidine | yellowish red |
| N-ethyl-2-ethylaniline | yellowish red |
| α-anilino-isobutyric acid-methylester | clear red |
| N-ethyl-o-anisidine | bluish red |
| N-cyanoethyl-o-anisidine | Bordeaux |
| 2-methylaminobenzoic acid-methylester | red |

| Dyestuff from 4-n-propoxy-2'-methyl-benzophenone and | Shade on polyacrylonitrile |
|---|---|
| dimethylaniline | bluish red |
| diethylaniline | bluish red |
| di-n-propylanline | bluish red |
| N-methyl-N-β-cyanoethylaniline | strongly bluish red |
| N-methyl-N-β-hydroxyethylaniline | strongly bluish red |
| 3-ethoxy-N,N-diethylaniline | strongly yellowish red |
| N-n-butylaniline | scarlet |
| N-isobutylaniline | bluish scarlet |
| N-β-hydroxyethylaniline | bluish red |
| N-benzylaniline | yellowish red |
| 2-methyl-N-methylaniline | bluish scarlet |
| 2-methyl-N-ethylaniline | red |
| 2-methyl-N-cyanoethylaniline | bluish red |
| 2-ethyl-N-β-cyanoethylaniline | bluish red |
| 2-methyl-N-benzylaniline | scarlet |
| 2-methyl-2,3-dihydroindole | yellowish scarlet |
| 1,2,3,3-tetramethylindoline | yellowish red |
| N-phenylmorpholine | strongly bluish red |
| 1-phenyl-3-methylpyrazoline | red-violet |
| 1,3-diphenylpyrazoline | reddish blue |
| N-n-butyl-o-toluidine | yellowish red |
| N-ethyl-2-ethylaniline | somewhat yellowish red |
| N-ethyl-2-chloroaniline | strongly bluish red |
| α-anilino-isobutyric acid-methylester | clear somewhat bluish red |

| Dyestuff from 4-isopropoxy-2'-methylbenzophenone and | Shade on polyacrylonitrile |
|---|---|
| dimethylaniline | yellowish red |
| diethylaniline | reddish orange |
| di-n-propylaniline | red |
| 2-methyl-N-methylaniline | yellowish orange |
| 2-methyl-N-ethylaniline | orange |

| Dyestuff from 4-n-butoxy-2'-methyl-benzophenone and | Shade on polyacrylonitrile |
|---|---|
| dimethylaniline | bluish red |
| diethylaniline | bluish red |
| di-n-propylaniline | bluish red |
| N-methyl-N-β-hydroxyethylaniline | strongly bluish red |
| N-methyl-N-β-cyanoethylaniline | strongly bluish red |
| 3-ethoxy-N,N-diethylaniline | yellowish red |
| N-n-butylaniline | scarlet |
| N-isobutylaniline | scarlet |
| N-benzylaniline | bluish scarlet |
| 2-methyl-N-methylaniline | strongly yellowish red |
| 2-methyl-N-ethylaniline | scarlet |
| 2-methyl-N-β-cyanoethylaniline | bluish red |
| 2-ethyl-N-β-cyanoethylaniline | bluish red |
| 2-methyl-N-benzylaniline | bluish red |
| 2-methyl-2,3-dihydroindole | yellowish scarlet |
| 1,2,3,3-tetramethylindoline | yellowish red |
| N-phenylmorpholine | strongly bluish red |
| 1-phenyl-3-methylpyrazoline | red-violet |
| 1,3-diphenylpyrazoline | bluish violet |
| N-n-butyl-o-toluidine | yellowish red |
| N-ethyl-2-chloroaniline | strongly bluish red |
| α-anilino-isobutyric acid-methylester | somewhat bluish red |

| Dyestuff from 4-methoxy-3'-methyl-benzophenone and | Shade on polyacrylonitrile |
|---|---|
| dimethylaniline | bluish red |
| diethylaniline | bluish red |
| di-n-propylaniline | bluish red |
| N-methyl-N-β-hydroxyethylaniline | bluish red |
| N-methyl-N-β-cyanoethylaniline | strongly bluish red |
| 2-methyl-N-methylaniline | yellowish red |
| 2-methyl-N-ethylaniline | yellowish red |
| 2-methyl-N-benzylaniline | red |
| 2-methyl-N-β-cyanoethylaniline | red |
| 2-ethyl-N-β-cyanoethylaniline | red |
| 2,5-dimethyl-N-β-cyanoethylaniline | bluish Bordeaux |
| 1,2,3,3-tetramethylindoline | red |
| N-phenylmorpholine | strongly bluish red |
| 1,3-diphenylpyrazoline | strongly bluish red |
| N-isopropyl-o-toluidine | red |
| N-ethyl-2-ethylaniline | red |
| α-anilino-isobutyric acid-methylester | clear bluish red |
| N-ethyl-o-anisidine | Bordeaux |

| Dyestuff from 4-ethoxy-3'-methyl-benzophenone and | Shade on polyacrylonitrile |
|---|---|
| dimethylaniline | bluish red |
| diethylaniline | bluish red |
| di-n-propylaniline | strongly bluish red |
| N-methyl-N-β-cyanoethylaniline | strongly bluish red |
| N-methyl-N-β-hydroxyethylaniline | strongly bluish red |
| 2-methyl-N-methylaniline | yellowish red |
| 2-methyl-N-ethylaniline | yellowish red |
| 2-methyl-N-benzylaniline | bluish red |
| 2-methyl-N-β-cyanoethylaniline | red |
| 2-ethyl-N-β-cyanoethylaniline | bluish red |
| 2,3-dimethyl-N-β-cyanoethylaniline | bluish red |
| 1,2,3,3-tetramethylindoline | bluish red |
| N-phenylmorpholine | strongly bluish red |
| 1,3-diphenylpyrazoline | bluish red |
| N-isopropyl-o-toluidine | red |
| α-anilino-isobutyric acid-methylester | clear bluish red |

| Dyestuff from 4-methoxy-4'-methyl-benzophenone and | Shade on polyacrylonitrile |
|---|---|
| 2-ethyl-N-β-cyanoethylaniline | red |
| 2,3-dimethyl-N-β-cyanoethylaniline | strongly bluish Bordeaux |
| 2-methyl-N-β-cyanoethylaniline | bluish red |
| N-phenylmorpholine | bluish ruby |
| 1,2,3,3-tetramethylindoline | red-Bordeaux |
| α-anilino-isobutyric acid-methylester | clear bluish red |
| N-ethyl-o-anisidine | ruby |

| Dyestuff from 4-methoxy-2',4'-dimethylbenzophenone and | Shade on polyacrylonitrile |
|---|---|
| dimethylaniline | red |
| diethylaniline | red |
| N-ethyl-N-β-chloroethylaniline | Bordeaux |
| N,N-di-β-chloroethylaniline | bluish red |
| N-ethyl-N-benzylaniline | bluish red |
| N-methyldiphenylamine | bluish Bordeaux |
| N-methyl-N-4-ethoxyphenylaniline | strongly bluish Bordeaux |
| 3-methyl-N,N-dimethylaniline | bluish red |
| N,N-di-n-propylaniline | bluish red |
| N-methyl-N-β-hydroxyethylaniline | bluish red |
| N-methyl-N-β-cyanoethylaniline | strongly bluish red |
| 3-ethoxy-N,N-diethylaniline | yellowish red |
| 2-methyl-N-methylaniline | scarlet |
| 2-methyl-N-ethylaniline | bluish scarlet |
| 2-methyl-N-β-cyanoethylaniline | red |
| N-n-butylaniline | yellowish scarlet |
| N-isobutylaniline | strongly yellowish red |
| 2-methyl-N-benzylaniline | yellowish red |
| 2-ethyl-N-β-cyanoethylaniline | red |
| 1,2,3,3-tetramethylindoline | yellowish red |
| N-phenylmorpholine | bluish red |

| Dyestuff from 4-methoxy-3',4'-dimethylbenzophenone and | Shade on polyacrylonitrile |
|---|---|
| dimethylaniline | bluish red |
| diethylaniline | bluish red |
| N-ethyl-N-β-chloroethylaniline | bluish red |
| N-butyl-N-β-chloroethylaniline | bluish red |
| N-methyldiphenylamine | strongly bluish Bordeaux |
| 3-methyl-N,N-dimethylaniline | bluish Bordeaux |
| 2-ethyl-N-β-cyanoethylaniline | red |
| 2,3-dimethyl-N-β-cyanoethylaniline | bluish Bordeaux |
| 2-methyl-N-methylaniline | red |
| 2-methyl-N-ethylaniline | red |
| 2-methyl-N-cyanoethylaniline | red |
| N-isobutylaniline | red |
| 1,2,3,3-tetramethylindoline | bluish red |
| α-anilino-isobutyric acid-methylester | clear red |

| Dyestuff from 4-methoxy-2',5'-dimethylbenzophenone and | Shade on polyacrylonitrile |
|---|---|
| dimethylaniline | yellowish red |
| diethylaniline | yellowish red |
| N-ethyl-Nβ-chloroethylaniline | red |
| N-methyldiphenylamine | bluish Bordeaux |
| N-methyl-N-4-ethoxyphenylaniline | red-violet |
| 3-methyl-N,N-dimethylaniline | reddish Bordeaux |

| Dyestuff from 4-methoxy-2',4',5'-trimethylbenzophenone and | Shade on polyacrylonitrile |
|---|---|
| dimethylaniline | red |
| diethylaniline | red |
| N-ethyl-N-β-chloroethylaniline | bluish red |
| N-isobutylaniline | strongly yellowish red |
| 2-methyl-N-methylaniline | strongly yellowish red |
| 2-methyl-N-ethylaniline | strongly yellowish red |
| 2-methyl-N-β-cyanoethylaniline | red |
| 2-methyl-N-benzylaniline | red |
| 2-ethyl-N-β-cyanoethylaniline | yellowish red |
| 2,3-dimethyl-N-β-cyanoethylaniline | bluish ruby |
| 2,5-dimethyl-N-β-cyanoethylaniline | Bordeaux |
| tetrahydroquinoline | strongly yellowish red |
| 2-methyl-2,3-dihydroindole | strongly yellowish red |
| 1,2,3,3-tetramethylindoline | yellowish red |
| 1,3-diphenylpyrazoline | reddish blue |
| di-n-propylaniline | bluish red |
| N-ethyl-N-β-dimethylamino-ethylaniline | bluish red |
| N-n-propyl-o-toluidine | yellowish red |
| N-i-propyl-o-toluidine | yellowish red |
| N-n-butyl-o-toluidine | somewhat yellowish red |
| N-ethyl-2-ethylaniline | scarlet |
| α-anilino-isobutyric acid-methylester | strongly bluish scarlet |
| N-ethyl-o-anisidine | strongly bluish red |
| 2-methylaminobenzoic acid-methylester | red |

| Dyestuff from 4-methoxy-diethyl-benzophenone and | Shade on polyacrylonitrile |
|---|---|
| dimethylaniline | bluish red |
| diethylaniline | bluish red |
| di-n-propylaniline | bluish red |
| N-methyl-N-β-cyanoethylaniline | strongly bluish red |
| N-methyl-N-β-hydroxyethylaniline | bluish red |
| N-n-butyl-N-β-chloroethylaniline | ruby |
| N-ethyl-N-benzylaniline | strongly bluish red |
| 3-ethoxy-N,N-diethylaniline | strongly yellowish red |
| N-isobutylaniline | strongly yellowish red |
| N-benzylaniline | yellowish red |
| 2-methyl-N-methylaniline | strongly yellowish red |
| 2-methyl-N-ethylaniline | strongly yellowish red |
| 2-methyl-N-β-cyanoethylaniline | yellowish red |
| 2-ethyl-N-β-cyanoethylaniline | yellowish red |
| 2-methyl-N-benzylaniline | red |
| 1,2,3,3-tetramethylindoline | yellowish red |
| N-phenylmorpholine | bluish red |

| Dyestuff from 4-methoxy-2',4'-di-isopropylbenzophenone and | Shade on polyacrylonitrile |
|---|---|
| dimethylaniline | red |
| diethylaniline | red |
| di-n-propylaniline | bluish red |
| N-methyl-N-β-chloroethylaniline | bluish red |
| N-ethyl-N-β-chloroethylaniline | bluish red |
| N-butyl-N-β-chloroethylaniline | strongly bluish red |
| 5-methyl-N-ethyl-N-β-chloroethylaniline | bluish Bordeaux |
| 2-methyl-N-methylaniline | strongly yellowish red |
| 2-methyl-N-β-cyanoethylaniline | red |

| Dyestuff from 4-methoxy-2',5'-di-isopropylbenzophenone and diethylaniline | Shade on polyacrylonitrile red bluish red |
|---|---|

| Dyestuff from 4-methoxy-4'-tert.-butylbenzophenone and | Shade on polyacrylonitrile |
|---|---|
| dimethylaniline | bluish red |
| diethylaniline | strongly bluish red |
| di-n-propylaniline | ruby |
| N-methyl-N-β-cyanoethylaniline | strongly bluish red |
| N-methyl-N-β-hydroxyethylaniline | ruby |
| N-n-butyl-N-β-chloroethylaniline | ruby |
| N-ethyl-N-benzylaniline | strongly bluish red |
| 3-ethoxy-N,N-diethylaniline | red-Bordeaux |
| 2-methyl-N-methylaniline | bluish red |
| 2-methyl-N-ethylaniline | red |
| 2-methyl-N-β-cyanoethylaniline | bluish red |
| N-n-butylaniline | yellowish red |
| N-isobutylaniline | yellowish red |
| N-benzylaniline | yellowish red |
| 2-methyl-N-benzylaniline | red |
| 2-ethyl-N-β-cyanoethylaniline | red |
| 1,2,3,3-tetramethylindoline | bluish red |

| Dyestuff from 2-methyl-4-methoxy-2'-chlorobenzophenone and | Shade on polyacrylonitrile |
|---|---|
| dimethylaniline | yellowish red |
| diethylaniline | yellowish red |
| N-methyl-N-β-chloroethylaniline | red |
| N-ethyl-N-β-chloroethylaniline | yellowish red |
| N-butyl-N-β-chloroethylaniline | red |
| 3-methyl-N,N-dimethylaniline | yellowish red |

| Dyestuff from 2-methyl-4-methoxy-2'-bromobenzophenone and | Shade on polyacrylonitrile |
|---|---|
| dimethylaniline | strongly yellowish red |
| diethylaniline | yellowish red |
| N-ethyl-N-β-chloroethylaniline | yellowish red |
| 3-methyl-N-ethyl-N-β-chloroethylaniline | red-Bordeaux |
| 3-methyl-N,N-dimethylaniline | yellowish red |

| Dyestuff from 2,2'-dimethyl-4-methoxybenzophenone and | Shade on polyacrylonitrile |
|---|---|
| dimethylaniline | strongly yellowish red |
| diethylaniline | strongly yellowish red |
| di-n-propylaniline | strongly yellowish red |
| N-methyl-N-β-hydroxyethylaniline | red |
| N-methyl-N-β-cyanoethylaniline | bluish red |
| 2-methyl-N-methylaniline | reddish orange |
| 2-methyl-N-ethylaniline | reddish orange |
| 2-methyl-N-β-cyanoethylaniline | scarlet |
| 2-ethyl-N-β-cyanoethylaniline | bluish scarlet |
| 2,5-dimethyl-N-β-cyanoethylaniline | strongly bluish red |
| 2-methyl-N-benzylaniline | scarlet |
| 1,2,3,3-tetramethylindoline | strongly reddish orange |
| N-phenylmorpholine | red |
| 1-phenyl-3-methylpyrazoline | bluish ruby |
| 1,3-diphenylpyrazoline | strongly reddish blue |
| N-methyldiphenylamine | bluish ruby |

| Dyestuff from 2,3'-dimethyl-4-methoxybenzophenone and | Shade on polyacrylonitrile |
|---|---|
| dimethylaniline | strongly yellowish red |
| diethylaniline | yellowish red |
| di-n-propylaniline | yellowish red |
| N-methyl-N-β-cyanoethylaniline | red |
| N-methyl-N-β-hydroxyethylaniline | red |
| 2-methyl-N-methylaniline | yellowish scarlet |
| 2-methyl-N-ethylaniline | yellowish scarlet |
| 2-methyl-N-benzylaniline | scarlet |
| 2-methyl-N-β-cyanoethylaniline | scarlet |
| 2-ethyl-N-β-cyanoethylaniline | bluish scarlet |
| 2,5-dimethyl-N-β-cyanoethylaniline | strongly bluish red |
| 1,2,3,3-tetramethylindoline | strongly yellowish red |
| N-phenylmorpholine | bluish red |
| 1-phenyl-3-methylpyrazoline | bluish ruby |
| 1,3-diphenylpyrazoline | strongly reddish dark-blue |
| N-methyldiphenylamine | Bordeaux |

| Dyestuff from 2,4'-dimethyl-4-methoxybenzophenone and | Shade on polyacrylonitrile |
|---|---|
| dimethylaniline | yellowish red |
| diethylaniline | red |
| N-methyl-N-β-chloroethylaniline | red |

| | |
|---|---|
| N-n-butyl-N-β-chloroethylaniline | red |
| 3-methyl-N-ethyl-N-β-chloroethylaniline | Bordeaux |
| di-n-propylaniline | red |
| 2-methyl-N-methylaniline | yellowish scarlet |
| 2-methyl-N-ethylaniline | strongly yellowish red |
| 2-methyl-N-benzylaniline | yellowish red |
| 2-methyl-N-β-cyanoethylaniline | yellowish red |
| 2-ethyl-N-β-cyanoethylaniline | bluish scarlet |
| 2,5-dimethyl-N-β-cyanoethylaniline | strongly bluish red |
| 1,2,3,3-tetramethylindoline | yellowish red |
| N-phenylmorpholine | bluish ruby |
| 1-phenyl-3-methylpyrazoline | bluish Bordeaux |
| 1,3-diphenylpyrazoline | strongly reddish blue |

| Dyestuff from 2-methyl-4-methoxy-4'-tert.-butylbenzophenone and | Shade on polyacrylonitrile |
|---|---|
| dimethylaniline | red |
| diethylaniline | red |
| di-n-propylaniline | bluish red |
| N-methyl-N-β-cyanoethylaniline | bluish red |
| N-methyl-N-β-hydroxyethylaniline | bluish red |
| 3-ethoxy-N,N-diethylaniline | yellowish red |
| 2-methyl-N-methylaniline | scarlet |
| 2-methyl-N-ethylaniline | scarlet |
| 2-methyl-N-β-cyanoethylaniline | bluish scarlet |
| N-n-butylaniline | yellowish scarlet |
| N-isobutylaniline | yellowish scarlet |
| 2-ethyl-N-β-cyanoethylaniline | strongly yellowish red |
| 2-methyl-N-benzylaniline | scarlet |

| Dyestuff from 4-ethoxy-2',4'-dimethylbenzophenone and | Shade on polyacrylonitrile |
|---|---|
| dimethylaniline | bluish red |
| diethylaniline | red |
| di-n-propylaniline | bluish red |
| 2-methyl-N-methylaniline | strongly yellowish red |
| 2-methyl-N-ethylaniline | strongly yellowish red |
| 2-methyl-N-benzylaniline | yellowish red |
| 2-methyl-N-β-cyanoethylaniline | red |
| 2-ethyl-N-β-cyanoethylaniline | yellowish red |
| N-n-butylaniline | strongly yellowish red |
| N-isobutylaniline | strongly yellowish red |
| α-anilino-isobutyric acid-methylester | clear red |

| Dyestuff from 4-ethoxy-2',4',5'-trimethylbenzophenone and | Shade on polyacrylonitrile |
|---|---|
| dimethylaniline | red |
| diethylaniline | red |
| di-n-propylaniline | bluish red |
| 2-methyl-N-methylaniline | strongly yellowish red |
| 2-methyl-N-ethylaniline | strongly yellowish red |
| 2-methyl-N-β-cyanoethylaniline | yellowish red |

| Dyestuff from 4-ethoxy-4'-tert.-butylbenzophenone and | Shade on polyacrylonitrile |
|---|---|
| dimethylaniline | strongly bluish red |
| diethylaniline | strongly bluish red |
| di-n-propylaniline | strongly bluish red |
| N-isobutylaniline | yellowish red |
| 2-methyl-N-methylaniline | bluish red |
| 2-methyl-N-ethylaniline | red |
| 2-methyl-N-β-cyanoethylaniline | red |
| N-methyl-N-β-hydroxyethylaniline | strongly bluish red |
| N-methyl-N-β-cyanoethylaniline | strongly bluish red |
| 1,2,3,3-tetramethylindoline | bluish red |
| N-phenylmorpholine | ruby |
| 1,3-diphenylpyrazoline | reddish blue |
| α-anilino-isobutyric acid-methylester | bluish red |

| Dyestuff from 2,4-dimethoxy-2'-chlorobenzophenone and | Shade on polyacrylonitrile |
|---|---|
| dimethylaniline | bluish red |
| diethylaniline | strongly bluish red |
| N-methyl-N-β-chloroethylaniline | reddish Bordeaux |
| N-ethyl-N-β-chloroethylaniline | reddish Bordeaux |
| N-butyl-N-β-chloroethylaniline | Bordeaux |
| 3-chloro-N,N-dimethylaniline | currant-grey |
| 3-methyl-N,N-dimethylaniline | bluish Bordeaux |

| Dyestuff from 2,4-dimethoxy-4'-chlorobenzophenone and | Shade on polyacrylonitrile |
|---|---|
| dimethylaniline | bluish red |
| diethylaniline | red-Bordeaux |
| N-ethyl-N-β-chloroethylaniline | reddish Bordeaux |

| Dyestuff from 2,4-dimethoxy-2',5'-dichlorobenzophenone and | Shade on polyacrylonitrile |
|---|---|
| dimethylaniline | red-Bordeaux |
| diethylaniline | red-Bordeaux |
| N-ethyl-N-β-chloroethylaniline | reddish Bordeaux |

| Dyestuff from 2,4-dimethoxy-2'-bromobenzophenone and | Shade on polyacrylonitrile |
|---|---|
| dimethylaniline | reddish Bordeaux |
| diethylaniline | reddish Bordeaux |
| N-methyl-N-β-chloroethylaniline | bluish ruby |
| N-ethyl-N-β-chloroethylaniline | Bordeaux |

| Dyestuff from 2,4-dimethoxy-3'-methylbenzophenone and | Shade on polyacrylonitrile |
|---|---|
| dimethylaniline | strongly bluish red |
| diethylaniline | strongly bluish red |
| di-n-propylaniline | strongly bluish red |
| N-methyl-N-β-cyanoethylaniline | Bordeaux |
| 2-methyl-N-β-cyanoethylaniline | strongly bluish red |
| 2-methyl-N-benzylaniline | bluish red |
| 1,2,3,3-tetramethylindoline | red |
| N-phenylmorpholine | red |
| 1,3-diphenylpyrazoline | reddish blue |

| Dyestuff from 4-methoxy-4'-phenoxybenzophenone and | Shade on polyacrylonitrile |
|---|---|
| dimethylaniline | dull red |
| diethylaniline | dull red |
| di-n-propylaniline | reddish Bordeaux |
| 3-chloro-N,N-diethylaniline | reddish grey |
| 3-ethoxy-N,N-diethylaniline | bluish red |
| 3-methyl-N,N-dimethylaniline | strongly bluish Bordeaux |
| 2-methyl-N-β-cyanoethylaniline | red |
| 2-ethoxy-N-β-cyanoethylaniline | Bordeaux |

| Dyestuff from 2,4'-dimethoxybenzophenone and | Shade on polyacrylonitrile |
|---|---|
| dimethylaniline | red |
| diethylaniline | bluish red |
| di-n-propylaniline | bluish red |
| di-n-butylaniline | bluish red |
| N-methyl-N-β-hydroxyethylaniline | bluish red |
| N-methyl-N-β-cyanoethylaniline | strongly bluish red |
| N-butyl-N-β-chloroethylaniline | bluish red |
| N-methyl-N-benzylaniline | red-Bordeaux |
| N-ethyl-N-benzylaniline | red-Bordeaux |
| N,N-dibenzylaniline | strongly bluish Bordeaux |
| N-phenylmorpholine | red-Bordeaux |
| 3-chloro-N,N-diethylaniline | bluish violet |
| 3-ethoxy-N,N-diethylaniline | yellowish red |
| N,N-diisopropylaniline | yellowish red |
| N-methyl-N-isopropylaniline | red |
| N-methyl-N-isobutylaniline | bluish red |
| N-ethyl-N-isopropylaniline | bluish red |
| N-isopropyl-N-isobutylaniline | red Bordeaux |
| N-methyl-N-ethylaniline | yellowish red |
| N-methyl-N-propylaniline | bluish red |
| N-ethyl-N-propylaniline | bluish red |
| N-propyl-N-isopropylaniline | bluish red |
| 2-methyl-N-methylaniline | yellowish red |
| 2-methyl-N-β-cyanoethylaniline | bluish red |
| 2-ethyl-N-β-cyanoethylaniline | red |
| 2,5-dimethyl-N-β-cyanoethylaniline | bluish ruby |
| 2-methyl-N-benzylaniline | red |
| 1,2,3,3,-tetramethylindoline | yellowish red |
| 1-phenyl-3-methylpyrazoline | strongly bluish Bordeaux |
| 1,3-diphenylpyrazoline | reddish blue |

| Dyestuff from 2-methoxy-4'-ethoxybenzophenone and | Shade on polyacrylonitrile |
|---|---|
| dimethylaniline | bluish red |
| diethylaniline | bluish red |
| di-n-propylaniline | bluish red |
| di-n-butylaniline | strongly bluish red |
| N-methyl-N-β-hydroxyethylaniline | bluish red |

| | |
|---|---|
| N,N-diisopropylaniline | red |
| N-methyl-N-isopropylaniline | bluish red |
| N-methyl-N-isobutylaniline | bluish red |
| N-ethyl-N-isopropylaniline | bluish red |
| N-isopropyl-N-isobutylaniline | strongly bluish red |
| N-methyl-N-ethylaniline | bluish red |
| N-methyl-N-propylaniline | bluish red |
| N-ethyl-N-propylaniline | strongly bluish red |
| N-propyl-N-isopropylaniline | strongly bluish red |
| N-phenylmorpholine | strongly bluish red |
| 1,2,3,3-tetramethylindoline | red |
| 1,3-diphenylpyrazoline | reddish blue |
| 2-methyl-N-ethylaniline | yellowish red |
| 2-methyl-N-β-cyanoethylaniline | bluish red |

| Dyestuff from 2-methoxy-4'-propoxybenzophenone and | Shade on polyacrylonitrile |
|---|---|
| dimethylaniline | red |
| diethylaniline | bluish red |
| di-n-propylaniline | bluish red |
| di-n-butylaniline | strongly bluish red |
| N-methyl-N-β-hydroxyethylaniline | bluish red |
| N-methyl-N-isopropylaniline | bluish red |
| N-ethyl-N-isopropylaniline | bluish red |
| N-isopropyl-N-isobutylaniline | strongly bluish red |
| N-methyl-N-ethylaniline | red |
| N-methyl-N-propylaniline | bluish red |
| N-methyl-N-propylaniline | bluish red |
| N-propyl-N-isopropylaniline | bluish red |

| Dyestuff from 2,4'-dimethoxy-2'-chlorobenzophenone and | Shade on polyacrylonitrile |
|---|---|
| dimethylaniline | reddish brown |
| diethylaniline | yellow-brown |
| di-n-propylaniline | yellow-brown |
| di-n-butylaniline | yellow-brown |
| N-methyl-N-β-hydroxyethylaniline | yellowish brick-red |
| N-methyl-N-isobutylaniline | orange-brown |

| Dyestuff from 2,4'-dimethoxy-3'-chlorobenzophenone and | Shade on polyacrylonitrile |
|---|---|
| dimethylaniline | yellowish red |
| diethylaniline | yellowish red |
| di-n-propylaniline | yellowish red |
| di-n-butylaniline | yellowish red |
| N-methyl-N-β-hydroxyethylaniline | red |
| N,N-diisopropylaniline | yellowish scarlet |
| N-methyl-N-isopropylaniline | yellowish red |
| N-methyl-N-isobutylaniline | yellowish red |
| N-methyl-N-ethylaniline | yellowish red |
| N-methyl-N-propylaniline | yellowish red |
| N-ethyl-N-propylaniline | yellowish red |
| N-propyl-N-isopropylaniline | yellowish red |

| Dyestuff from 2,4'-dimethoxy-2'-methylbenzophenone and | Shade on polyacrylonitrile |
|---|---|
| dimethylaniline | strongly yellowish red |
| diethylaniline | yellowish red |
| di-n-propylaniline | yellowish red |
| di-n-butylaniline | red |
| N-methyl-N-β-hydroxyethylaniline | red |
| N-methyl-N-isopropylaniline | yellowish red |
| N-ethyl-N-isopropylaniline | yellowish red |
| N-propyl-N-isopropylaniline | yellowish red |
| N-methyl-N-ethylaniline | yellowish red |
| N-propyl-N-methylaniline | yellowish red |
| N-ethyl-N-propylaniline | yellowish red |
| N-isopropyl-N-isobutylaniline | red |
| N-methyl-N-isobutylaniline | yellowish red |
| 2-methyl-N-methylaniline | yellowish scarlet |
| 2-methyl-N-ethylaniline | yellowish scarlet |
| 2-methyl-N-β-cyanoethylaniline | red |
| 2-methyl-N-benzylaniline | yellowish red |
| N-methyl-N-β-cyanoethylaniline | bluish red |

| Dyestuff from 2,4'-dimethoxy-3'-methylbenzophenone and | Shade on polyacrylonitrile |
|---|---|
| dimethylaniline | bluish red |
| diethylaniline | bluish red |
| di-n-propylaniline | bluish red |
| di-n-butylaniline | strongly bluish red |
| N-methyl-N-β-hydroxyethylaniline | strongly bluish red |
| N,N-diisopropylaniline | red |

| Dyestuff from 2,4'-dimethoxy-5'-methylbenzophenone and | Shade on polyacrylonitrile |
|---|---|
| dimethylaniline | red |
| diethylaniline | bluish red |
| di-n-propylaniline | red-Bordeaux |

| Dyestuff from 2,4'-dimethoxy-2'-methyl-5'-chlorobenzophenone and | Shade on polyacrylonitrile |
|---|---|
| dimethylaniline | strongly yellowish red |
| diethylaniline | yellowish scarlet |
| di-n-propylaniline | strongly yellowish red |
| di-n-butylaniline | strongly yellowish red |
| N-methyl-N-β-hydroxyethylaniline | yellowish red |
| N,N-diisopropylaniline | reddish orange |
| N-methyl-N-isopropylaniline | strongly yellowish red |
| N-ethyl-N-isopropylaniline | strongly yellowish red |
| N-propyl-N-isopropylaniline | strongly yellowish red |
| N-methyl-N-ethylaniline | strongly yellowish red |
| N-methyl-N-propylaniline | strongly yellowish red |
| N-ethyl-N-propylaniline | strongly yellowish red |
| N-methyl-N-isobutylaniline | strongly yellowish red |
| N-isopropyl-N-isobutylaniline | yellowish red |

| Dyestuff from 2,4'-dimethoxy-2'-chloro-5'-methylbenzophenone and | Shade on polyacrylonitrile |
|---|---|
| dimethylaniline | yellowish brick-red |
| diethylaniline | yellow-brown |
| di-n-butylaniline | red-brown |
| N-methyl-N-β-hydroxyethylaniline | strongly yellowish red |
| N-methyl-N-isopropylaniline | yellowish brick-red |
| N-methyl-N-isobutylaniline | brick-red |

| Dyestuff from 2,4'-dimethoxy-4,6-dimethylbenzophenone and | Shade on polyacrylonitrile |
|---|---|
| dimethylaniline | red |
| diethylaniline | red |
| di-n-propylaniline | yellowish Bordeaux |
| N-methyl-N-β-hydroxyethylaniline | bluish red |
| N-methyl-N-β-cyanoethylaniline | strongly bluish red |
| N,N-diisopropylaniline | strongly yellowish red |
| N-methyl-N-isopropylaniline | red |
| N-methyl-N-isobutylaniline | red |
| N-ethyl-N-isopropylaniline | red |
| N-isopropyl-N-isobutylaniline | bluish red |

| Dyestuff from 2,4'-dimethoxy-2'-chloro-3'-methylbenzophenone and | Shade on polyacrylonitrile |
|---|---|
| dimethylaniline | strongly yellowish brick-red |
| diethylaniline | yellowish brick-red |
| di-n-propylaniline | brick-red |
| di-n-butylaniline | brick-red |
| N-methyl-N-β-hydroxyethylaniline | yellowish red |
| N-methyl-N-β-cyanoethylaniline | red |
| N-methyl-N-benzylaniline | bluish red |
| 3-methoxy-N,N-diethylaniline | reddish orange |
| N,N-diisopropylaniline | reddish orange |
| N-methyl-N-isobutylaniline | strongly yellowish red |

| Dyestuff from 3,4'-dimethoxybenzophenone and | Shade on polyacrylonitrile |
|---|---|
| dimethylaniline | bluish red |
| diethylaniline | bluish red |
| di-n-propylaniline | red-Bordeaux |
| di-n-butylaniline | red-Bordeaux |
| N-methyl-N-β-hydroxyethylaniline | bluish red |
| N,N-di-β-hydroxyethylaniline | bluish red |
| N-methyl-N-β-cyanoethylaniline | strongly bluish red |

| | |
|---|---|
| N-butyl-N-β-chloroethylaniline | strongly bluish red |
| N-methyl-N-benzylaniline | red-Bordeaux |
| N-ethyl-N-benzylaniline | strongly bluish red |
| N,N-dibenzylaniline | ruby |
| N-methyldiphenylamine | bluish Bordeaux |
| N-methyl-N-4-ethoxyphenylaniline | strongly bluish Bordeaux |
| N-phenylmorpholine | strongly bluish red |
| 3-methyl-N-ethyl-N-benzylaniline | strongly bluish Bordeaux |
| 3-ethoxy-N,N-diethylaniline | red |
| N-methyl-N-β-methoxyethylaniline | bluish red |
| N-methyl-N-isopropylaniline | bluish red |
| N-ethyl-N-isopropylaniline | bluish red |
| N-propyl-N-isopropylaniline | bluish red |
| N-methyl-N-ethylaniline | bluish red |
| N-methyl-N-propylaniline | bluish red |
| N-ethyl-N-propylaniline | red-Bordeaux |
| N-methyl-N-isobutylaniline | bluish red |
| N-isopropyl-N-isobutylaniline | strongly bluish red |
| N-n-butylaniline | strongly yellowish red |
| N-isobutylaniline | strongly yellowish red |
| N-β-cyanoethylaniline | red |
| 2-methyl-N-methylaniline | strongly yellowish red |
| 2-methyl-N-ethylaniline | yellowish red |
| 2-methyl-N-β-cyanoethylaniline | bluish red |
| 2-ethyl-N-β-cyanoethylaniline | red |
| 2-methyl-N-benzylaniline | red |
| 1,2,3,3-tetramethylindoline | red |
| α-anilino-isobutyric acid-methylester | strongly bluish red |

| Dyestuff from 3-methoxy-4'-ethoxy-benzophenone and | Shade on polyacrylonitrile |
|---|---|
| dimethylaniline | bluish red |
| diethylaniline | bluish red |
| di-n-propylaniline | strongly bluish red |
| di-n-butylaniline | strongly bluish red |
| N-methyl-N-β-hydroxyethylaniline | bluish red |
| N,N-diisopropylaniline | red |
| N-methyl-N-isopropylaniline | bluish red |
| N-ethyl-N-isopropylaniline | bluish red |
| N-propyl-N-isopropylaniline | strongly bluish red |
| N-methyl-N-ethylaniline | bluish red |
| N-methyl-N-propylaniline | bluish red |
| N-ethyl-N-propylaniline | strongly bluish red |
| N-methyl-N-isobutylaniline | red-Bordeaux |
| N-isopropyl-N-isobutylaniline | strongly bluish red |
| 2-methyl-N-methylaniline | yellowish red |
| 2-methyl-N-ethylaniline | red |
| 2-methyl-N-β-cyanoethylaniline | bluish red |
| 2-ethyl-N-β-cyanoethylaniline | bluish red |
| 1,2,3,3-tetramethylindoline | bluish red |

| Dyestuff from 3-methoxy-4'-propoxy-benzophenone and | Shade on polyacrylonitrile |
|---|---|
| dimethylaniline | bluish red |
| diethylaniline | bluish red |
| di-n-propylaniline | bluish red |
| di-n-butylaniline | strongly bluish red |
| N-methyl-N-β-hydroxyethylaniline | bluish red |
| N,N-di-β2-hydroxyethylaniline | strongly bluish red |
| N-butyl-N-β-chloroethylaniline | strongly bluish red |
| N-methyl-N-isopropylaniline | bluish red |
| N-ethyl-N-isopropylaniline | strongly bluish red |
| N-propyl-N-isopropylaniline | strongly bluish red |
| N-methyl-N-ethylaniline | bluish red |
| N-methyl-N-propylaniline | bluish red |
| N-ethyl-N-propylaniline | bluish red |
| N-methyl-N-isobutylaniline | bluish red |
| N-isopropyl-N-isobutylaniline | strongly bluish red |

| Dyestuff from 3,4'-dimethoxy-2'-methylbenzophenone and | Shade on polyacrylonitrile |
|---|---|
| dimethylaniline | strongly yellowish red |
| diethylaniline | yellowish red |
| di-n-propylaniline | yellowish red |
| di-n-butylaniline | yellowish red |
| N-methyl-N-β-hydroxyethylaniline | bluish red |
| N-methyl-N-isopropylaniline | strongly yellowish red |
| N-methyl-N-ethylaniline | yellowish red |
| N-propyl-N-methylaniline | yellowish red |
| N-ethyl-N-propylaniline | yellowish red |
| N-propyl-N-isopropylaniline | yellowish red |
| 2-methyl-N-methylaniline | reddish orange |
| 2-methyl-N-ethylaniline | reddish orange |
| 2-methyl-N-β-cyanoethylaniline | strongly yellowish red |
| 2-ethyl-N-β-cyanoethylaniline | yellowish red |
| 1,2,3,3-tetramethylindoline | reddish orange |

| Dyestuff from 2,5,4'-trimethoxybenzo-phenone and | Shade on polyacrylonitrile |
|---|---|
| dimethylaniline | bluish red |
| diethylaniline | bluish red |
| di-n-propylaniline | strongly bluish red |
| di-n-butylaniline | strongly bluish red |
| N-methyl-N-β-hydroxyethylaniline | strongly bluish red |
| N,N-diisopropylaniline | yellowish red |

| Dyestuff from 3,4,3'-trimethoxybenzo-phenone and | Shade on polyacrylonitrile |
|---|---|
| dimethylaniline | bluish red |
| diethylaniline | bluish red |

| Dyestuff from 3,4,2'-trimethoxybenzo-phenone and | Shade on polyacrylonitrile |
|---|---|
| dimethylaniline | strongly bluish red |
| diethylaniline | strongly bluish red |
| di-n-propylaniline | strongly bluish red |
| di-n-butylaniline | ruby |
| N-methyl-N-β-hydroxyethylaniline | ruby |
| N-methyl-N-isopropylaniline | strongly bluish red |

| Dyestuff from 2-methoxy-1-(4'-methoxybenzoyl)-naphthalene and | Shade on polyacrylonitrile |
|---|---|
| dimethylaniline | red-Bordeaux |
| diethylaniline | red-Bordeaux |
| di-n-propylaniline | reddish Bordeaux |
| 2-methyl-N-β-cyanoethylaniline | red-Bordeaux |

| Dyestuff from 2-ethoxy-1-(4'-methoxybenzoyl)-naphthalene and | Shade on polyacrylonitrile |
|---|---|
| dimethylaniline | reddish Bordeaux |
| diethylaniline | reddish Bordeaux |
| di-n-propylaniline | Bordeaux |

| Dyestuff from 2-butoxy-1-(4'-methoxybenzoyl)-naphthalene and | Shade on polyacrylonitrile |
|---|---|
| dimethylaniline | reddish Bordeaux |
| diethylaniline | reddish Bordeaux |
| di-n-propylaniline | Bordeaux |

| Dyestuff from 2-methyl-4-n-pro-poxybenzophenone and | Shade on Polyacrylonitrile |
|---|---|
| dimethylaniline | yellowish red |
| diethylaniline | strongly yellowish red |
| N-methyl-2-methylaniline | strongly yellowish red |
| N-ethyl-2-methylaniline | scarlet |
| di-n-propylaniline | yellowish red |
| N-cyanoethyl-2-methylaniline | yellowish red |

| Dyestuff from 2-methyl-4-N-pro-poxybenzophenone and | Shade on polyacrylonitrile |
|---|---|
| N-methyl-N-β-cyanoethylaniline | bluish red |
| 3-ethoxy-N,N-diethylaniline | strongly yellowish red |
| 2-metyl-N-benzylaniline | strongly yellowish red |
| N-methyl-N-β-hydroxyethylaniline | bluish red |

| Dyestuff from 3,4-dimethoxybenzo-phenone | Shade on polyacrylonitrile |
|---|---|
| N-isobutylaniline | yellowish red |
| 2-methyl-N-benzylaniline | bluish red |
| N-phenylmorpholine | strongly bluish red |
| N-cyanoethylaniline | bluish red |

| Dyestuff from 3,4-dimethoxy-2'-methylbenzophenone and | Shade on polyacrylonitrile |
|---|---|

| | |
|---|---|
| dimethylaniline | strongly bluish red |
| diethylaniline | strongly bluish red |
| di-n-propylaniline | strongly bluish red |
| 2-methyl-N-methylaniline | red |
| 2-methyl-N-ethylaniline | bluish red |
| n-butylaniline | red |
| isobutylaniline | somewhat bluish red |

| | |
|---|---|
| Dyestuff from 4-methoxy-2',5'-dimethylbenzophenone and | Shade on polyacrylonitrile |
| di-n-propylaniline | bluish red |
| N-methyl-N-β-cyanoethylaniline | strongly bluish red |
| N-n-butyl-N-β-chloroethylaniline | ruby |
| N-methyl-N-β-hydroxyethylaniline | bluish red |
| N-n-butylaniline | reddish orange |
| N-isobutylaniline | strongly yellowish red |

| | |
|---|---|
| Dyestuff from 4-methoxy-2',5'-dimethylbenzophenone and | Shade on polyacrylonitrile |
| 2-methyl-N-methylaniline | strongly yellowish red |
| 2-methyl-N-ethylaniline | strongly yellowish red |
| 2-methyl-N-β-cyanoethylaniline | yellowish red |
| 2-methyl-N-benzylaniline | yellowish red |
| 2-ethyl-N-β-cyanoethylaniline | red |
| 1,2,3,3-tetramethylindoline | yellowish brick-red |
| N-phenylmorpholine | strongly bluish red |

| | |
|---|---|
| Dyestuff from 2-methyl-4-methoxy-2'-chlorobenzophenone and | Shade on polyacrylonitrile |
| di-n-propylaniline | yellowish red |
| 3-ethoxy-N,N-diethylaniline | reddish orange |
| 2-methyl-N-methylaniline | reddish orange |
| 2-methyl-N-ethylaniline | strongly yellowish red |
| 2-methyl-N-β-cyanoethylaniline | yellowish red |
| 2-methyl-N-benzylaniline | yellowish red |
| N-n-butylaniline | strongly reddish orange |
| N-isobutylaniline | reddish orange |

| | |
|---|---|
| Dyestuff from 3,4'-dimethoxy-3'-bromobenzophenone and | Shade on polyacrylonitrile |
| dimethylaniline | bluish red |
| diethylaniline | bluish red |
| di-n-propylaniline | strongly bluish red |
| diisopropylaniline | bluish red |
| di-n-butylaniline | strongly bluish red |
| N-methyl-N-ethylaniline | bluish red |
| N-methyl-N-propylaniline | bluish red |
| N-ethyl-N-propylaniline | bluish red |

| | |
|---|---|
| Dyestuff from 2,4-dimethoxy-3'-methylbenzophenone and | Shade on poly acrylonitrile |
| dimethylaniline | strongly bluish red |
| diethylaniline | strongly bluish red |
| di-n-propylaniline | strongly bluish red |
| N-methyl-N-β-cyanoethylaniline | Bordeaux |
| 2-methyl-N-β-cyanoethylaniline | strongly bluish red |
| 2-methyl-N-benzylaniline | bluish red |
| 1,2,3,3-tetramethylindoline | red |
| N-phenylmorpholine | red |
| 1,3-diphenylpyrazoline | reddish blue |

| | |
|---|---|
| Dyestuff from 4,4'-dimethoxybenzophenone and | Shade on polyacrylo nitrile |
| dimethylaniline | bluish red |
| diethylaniline | red-Bordeaux |
| N-methyldiphenylamine | strongly bluish Bordeaux |
| N-methyl-N-4-ethoxyphenylaniline | currant-blue |
| 3-methyl-N-ethyl-N-chloroethylaniline | currant |
| di-n-propylaniline | strongly bluish red |
| di-n-butylaniline | reddish Bordeaux |
| N-methyl-N-hydroxyethylaniline | bluish red |
| N-butyl-N-hydroxyethylaniline | strongly bluish red |
| N,N-dihydroxyethylaniline | strongly bluish red |
| N-methyl-N-β-cyanoethylaniline | bluish red |
| N-butyl-N-β-chloroethylaniline | strongly bluish red |
| N-ethyl-N-dimethylaminoethylaniline | strongly bluish red |
| N,N-bis-α,β-dihydroxyethylaniline | strongly bluish red |
| N-methyl-N-benzylaniline | strongly bluish red |
| N-ethyl-N-benzylaniline | bluish red |
| N,N-dibenzylaniline | strongly bluish red |
| N-phenylmorpholine | Bordeaux |
| 3-methyl-N,N-dimethylaniline | currant |
| 3-chloro-N,N-dimethylaniline | currant-blue |
| 3-chloro-N,N-diethylaniline | reddish black |
| 3-methyl-N-ethyl-N-benzylaniline | currant-blue |
| 3-methyl-N-ethyl-N-β-hydroxyethyl-aniline | currant |
| 3-methyl-N,N-di-β-hydroxyethyl-aniline | currant |
| 3-ethoxy-N,N-diethylaniline | Bordeaux |
| 1-dimethylaminonaphthalene | bluish Bordeaux |
| 1-diethylaminonaphthalene | strongly bluish Bordeaux |
| N,N-diisopropylaniline | red |
| 3-methoxy-N,N-diethylaniline | reddish Bordeaux |
| N-methyl-N-β-methoxyethylaniline | red-Bordeaux |
| N,N-di-β-methoxyethylaniline | red-Bordeaux |
| N-methyl-N-isobutylaniline | red Bordeaux |
| N-methyl-isopropylaniline | bluish red |
| N-ethyl-N-isopropylaniline | strongly bluish red |
| N-isopropyl-N-isobutylaniline | Bordeaux |
| 2-methyl-N-methylaniline | bluish red |
| 2-methyl-N-ethylaniline | red |
| N-n-butyaniline | bluish red |
| N-isobutylaniline | yellowish red |
| 2-methyl-N-benzylaniline | red |
| N-β-cyanoethylaniline | red |
| 2-methyl-N-β-cyanoethylaniline | red |
| N-benzylaniline | yellowish red |
| 2-ethyl-N-β-cyanoethylaniline | red |
| 2,3-dimethyl-N-β-cyanoethylaniline | Bordeaux |
| 2,5-dimethyl-N-β-cyanoethylaniline | Bordeaux |
| 2-ethoxy-N-β-cyanoethylaniline | Bordeaux |
| 2-hydroxy-N-β-cyanoethylaniline | Bordeaux |
| 2-methyl-2,3-dihydroindole | red |
| 1,2,3,3-tetramethylindoline | strongly bluish red |
| 1-phenyl-3-methylpyrazoline | currant-blue |
| 1,3-diphenylpyrazoline | dark-blue |
| N-methyl-N-ethylaniline | bluish red |
| N-methyl-N-propylaniline | bluish red |
| N-ethyl-N-propylaniline | bluish red |
| N-Propyl-N-isopropylaniline | bluish red |
| α-anilino-isobutyric acid-methylester | strongly bluish scarlet |
| N-n-propyl-o-toluidine | somewhat bluish red |
| N-i-propyl-o-toluidine | bluish red |
| N-n-butyl-o-toluidine | somewhat bluish red |
| N-ethyl-2-ethylaniline | red |
| N-ethyl-2-chloroaniline | red |
| N-ethyl-o-anisidine | bluish Bordeaux |

| | |
|---|---|
| Dyestuff from 4-methoxy-4'-ethoxybenzophenone and | Shade on poly acrylonitrile |
| dimethylaniline | red-Bordeaux |
| diethylaniline | red-Bordeaux |
| di-n-propylaniline | reddish Bordeaux |
| di-n-butylaniline | reddish Bordeaux |
| N-methyl-N-β-hydroxyethylaniline | bluish red |
| N-methyl-N-β-cyanoethylaniline | bluish red |
| N-butyl-N-β-chloroethylaniline | strongly bluish red |
| 3-ethoxy-N,N-diethylaniline | red-Bordeaux |
| N,N-diisopropylaniline | red |
| N-methyl-N-isopropylaniline | red-Bordeaux |
| N-methyl-N-isobutylaniline | red-Bordeaux |
| N-ethyl-N-isopropylaniline | reddish Bordeaux |
| N-isopropyl-N-isobutylaniline | Bordeaux |
| 2-methyl-N-methylaniline | bluish red |
| 2-methyl-N-ethylaniline | red |
| N-isobutylaniline | red |
| 2-methyl-N-β-cyanoethylaniline | yellowish red |
| N-n-butylaniline | bluish red |
| N-benzylaniline | yellowish red |
| 2-methyl-N-benzylaniline | red |
| 2-ethyl-N-β-cyanoethylaniline | yellowish red |
| 2,3-dimethyl-N-β-cyanoethylaniline | Bordeaux |
| N-phenylmorpholine | reddish Bordeaux |
| 1,2,3,3-tetramethylindoline | red-Bordeaux |
| N-methyl-N-ethylaniline | red-Bordeaux |
| N-ethyl-N-propylaniline | red-Bordeaux |
| N-methyl-N-propylaniline | red-Bordeaux |
| N-propyl-N-isopropylaniline | red-Bordeaux |
| N-n-butyl-o-toluidine | somewhat bluish red |

| | |
|---|---|
| Dyestuff from 4-methoxy-4'-n-propoxybenzophenone and | Shade on poly acrylonitrile |
| dimethylaniline | bluish red |
| diethylaniline | bluish red |

| | |
|---|---|
| di-n-propylaniline | bluish red |
| di-n-butylaniline | bluish red |
| diisopropylaniline | bluish red |
| N-methyl-N-isopropylaniline | strongly bluish red |
| N-methyl-N-isobutylaniline | red-Bordeaux |
| N-ethyl-N-isopropylaniline | bluish red |
| N-isopropyl-N-isobutylaniline | Bordeaux |
| N-methyl-N-ethylaniline | bluish red |
| N-ethyl-N-propylaniline | bluish red |
| N-methyl-N-propylaniline | bluish red |
| N-propyl-N-isopropylaniline | strongly bluish red |

| Dyestuff from 4-methoxy-4'-isopropoxybenzophenone and | Shade on polyacrylonitrile |
|---|---|
| dimethylaniline | bluish red |
| diethylaniline | strongly bluish red |
| di-n-propylaniline | strongly bluish red |
| di-n-butylaniline | red-Bordeaux |
| N-methyl-N-β-cyanoethylaniline | bluish red |
| N,N-diisopropylaniline | red |
| N,N-di-β-methoxyethylaniline | red-Bordeaux |
| N-methyl-N-isopropylaniline | bluish red |
| N-methyl-N-isobutylaniline | bluish red |
| N-ethyl-N-isopropylaniline | strongly bluish red |
| N-isopropyl-N-isobutylaniline | strongly bluish red |
| N-methyl-N-ethylaniline | strongly bluish red |
| N-methyl-N-propylaniline | strongly bluish red |
| N-ethyl-N-propylaniline | strongly bluish red |
| N-propyl-N-isopropylaniline | reddish Bordeaux |

| Dyestuff from 4-methoxy-4'-n-butoxybenzophenone and | Shade on polyacrylonitrile |
|---|---|
| dimethylaniline | bluish red |
| diethylanailine | bluish red |
| di-n-propylaniline | strongly bluish red |
| di-n-butylaniline | ruby |
| N-methyl-N-β-hydroxyethylaniline | bluish red |
| N,N-diisopropylaniline | bluish red |
| N-methyl-N-isopropylaniline | bluish red |
| N-methyl-N-isobutylaniline | red-Bordeaux |
| N-ethyl-N-isopropylaniline | strongly bluish red |
| N-isopropyl-N-isobutylaniline | reddish Bordeaux |
| N-methyl-N-ethylaniline | bluish red |
| N-methyl-N-propylaniline | bluish red |
| N-ethyl-N-propylaniline | strongly bluish red |
| N-propyl-N-isopropylaniline | reddish Bordeaux |
| isobutylaniline | somewhat bluish red |
| N-methyl-o-toluidine | somewhat bluish red |
| N-ethyl-o-toluidine | somewhat bluish red |

| Dyestuff from 4-methoxy-4'-phenoxy-benzophenone and | Shade on polyacrylonitrile |
|---|---|
| dimethylaniline | dull red |
| diethylaniline | dull red |
| di-n-propylaniline | reddish Bordeaux |
| 3-chloro-N,N-diethylaniline | reddish grey |
| 3-ethoxy-N,N-diethylaniline | bluish red |
| 3-methyl-N,N-dimethylaniline | strongly bluish Bordeaux |
| 2-methyl-N-β-cyanoethylaniline | red |
| 2-ethoxy-N-β-cyanoethylaniline | Bordeaux |

| Dyestuff from 4,4'-diethoxybenzophenone and | Shade on polyacrylonitrile |
|---|---|
| dimethylaniline | strongly bluish red |
| diethylaniline | strongly bluish red |
| N-methyl-N-β-hydroxyethylaniline | red-Bordeaux |
| N-butyl-N-β-hydroxyethylaniline | strongly bluish red |
| N,N-di-β-hydroxyethylaniline | red-Bordeaux |
| N-butyl-N-β-chloroethylaniline | reddish Bordeaux |
| N-methyldiphenylamine | strongly bluish Bordeaux |
| N-methyl-N-4-ethoxyphenylaniline | currant-grey |
| N-methyl-N-isopropylaniline | reddish Bordeaux |
| N-methyl-N-isobutylaniline | very strongly bluish red |
| N-ethyl-N-isopropylaniline | reddish Bordeaux |
| N-isopropyl-N-isobutylaniline | reddish Bordeaux |
| N-methyl-N-ethylaniline | strongly bluish red |
| N-methyl-N-propylaniline | strongly bluish red |
| N-ethyl-N-propylaniline | strongly bluish red |
| N-propyl-N-isopropylaniline | reddish Bordeaux |
| 3-ethoxy-N,N-diethylaniline | reddish Bordeaux |
| 2-methyl-N-methylaniline | bluish red |
| 2-methyl-N-ethylaniline | red |
| N-isobutylaniline | red |
| 2-methyl-N-β-cyanoethylaniline | red |
| N-n-butylaniline | bluish red |
| N-benzylaniline | yellowish red |
| 2-methyl-N-benzylaniline | red |
| 2-ethyl-N-β-cyanoethylaniline | yellowish red |
| 2,3-dimethyl-N-β-cyanoethylaniline | Bordeaux |
| N-phenylmorpholine | Bordeaux |
| 1,2,3,3-tetramethylindoline | ruby |

| Dyestuff from 4-ethoxy-4'-propoxy-benzophenone and | Shade on polyacrylonitrile |
|---|---|
| 2-methyl-N-methylaniline | red |
| 2-methyl-N-ethylaniline | red |
| N-isobutylaniline | red |
| N-β-cyanoethylaniline | red |
| 2-methyl-N-β-cyanoethylaniline | red |

| Dyestuff from 4,4'-di-n-propoxybenzophenone and | Shade on polyacrylonitrile |
|---|---|
| dimethylaniline | bluish red |
| 3-chloro-N,N-diethylaniline | grey |
| 2-methyl-N-β-cyanoethylaniline | red |

| Dyestuff from 4,4'-di-n-butoxy-benzophenone and | Shade on polyacrylonitrile |
|---|---|
| dimethylaniline | bluish red |
| diethylaniline | strongly bluish red |
| di-n-propylaniline | Bordeaux |

| Dyestuff from 4,4'-dimethoxy-2-chlorobenzophenone and | Shade on polyacrylonitrile |
|---|---|
| dimethylaniline | red |
| diethylaniline | red |
| di-n-propylaniline | bluish red |
| di-n-butylaniline | bluish red |
| N-methyl-N-β-hydroxyethylaniline | bluish red |
| N,N-di-β-hydroxyethylaniline | bluish red |
| N-methyl-N-β-cyanoethylaniline | bluish red |
| N-butyl-N-β-chloroethylaniline | bluish red |
| N-methyl-N-benzylaniline | bluish red |
| N-ethyl-N-benzylaniline | bluish red |
| N,N-dibenzylaniline | strongly bluish red |
| N-methyldiphenylamine | bluish Bordeaux |
| N-methyl-N-4-ethoxyphenylaniline | strongly bluish Bordeaux |
| N-phenylmorpholine | bluish red |
| 3-ethoxy-N,N-diethylaniline | yellowish red |
| N,N-diisopropylaniline | yellowish red |
| N-methyl-N-β-methoxyethylaniline | bluish red |
| N-methyl-N-isopropylaniline | red |
| N-methyl-N-isobutylaniline | bluish red |
| N-ethyl-N-isopropylaniline | bluish red |
| N-isopropyl-N-isobutylaniline | red-Bordeaux |
| N-methyl-N-ethylaniline | red |
| N-methyl-N-propylaniline | bluish red |
| N-ethyl-N-propylaniline | bluish red |
| N-propyl-N-isopropylaniline | bluish red |
| isobutylaniline | somewhat yellowish red |
| N-methyl-o-toluidine | somewhat yellowish red |
| N-ethyl-o-toluidine | somewhat yellowish red |
| N-cyanoethyl-o-toluidine | red |
| 1,2,3,3-tetramethylindoline | red |

| Dyestuff from 4,4'-diemethoxy-3-chlorobenzophenone and | Shade on polyacrylonitrile |
|---|---|
| dimethylaniline | bluish red |
| diethylaniline | bluish red |
| di-n-propylaniline | strongly bluish red |
| di-n-butylaniline | strongly bluish red |
| N-methyl-N-β-hydroxyethylaniline | bluish red |
| N,N-di-β-hydroxyethylaniline | strongly bluish red |
| N-butyl-N-β-chloroethylaniline | strongly bluish red |
| N-methyl-N-benzylaniline | strongly bluish red |
| N-phenylmorpholine | strongly bluish red |
| 3-ethoxy-N,N-diethylaniline | bluish red |
| N,N-diisopropylaniline | red |
| N-methyl-N-β-methoxyethylaniline | strongly bluish red |
| N-methyl-N-isopropylaniline | bluish red |
| N-methyl-N-isobutylaniline | strongly bluish red |
| N-ethyl-N-isopropylaniline | strongly bluish red |

| | |
|---|---|
| N-isopropyl-N-isobutylaniline | reddish Bordeaux |
| N-methyl-N-ethylaniline | bluish red |
| N-methyl-N-propylaniline | bluish red |
| N-ethyl-N-propylaniline | strongly bluish red |
| N-propyl-N-isopropylaniline | strongly bluish red |

| Dyestuff from 4,4'-dimethoxy-3,3'-dichlorobenzophenone and | Shade on polyacrylonitrile |
|---|---|
| dimethylaniline | bluish red |
| diethylaniline | strongly bluish red |

| Dyestuff from 4,4'-dimethoxy-2-methylbenzophenone and | Shade on polyacrylonitrile |
|---|---|
| dimethylaniline | red |
| diethylaniline | bluish red |
| di-n-propylaniline | bluish red |
| di-n-butylaniline | bluish red |
| N-methyl-N-β-hydroxyethylaniline | bluish red |
| N,N-di-β-hydroxyethylaniline | bluish red |
| N-methyl-N-β-cyanoethylaniline | red |
| N-butyl-N-β-chloroethylaniline | bluish red |
| N-methyl-N-benzylaniline | bluish red |
| N-ethyl-N-benzylaniline | bluish red |
| N,N-dibenzylaniline | bluish red |
| N-phenylmorpholine | bluish red |
| 3-methyl-N-ethyl-N-hydroxyethyl aniline | strongly bluish Bordeaux |
| 3-ethoxy-N,N-diethylaniline | yellowish red |
| N,N-diisopropylaniline | yellowish red |
| N-methyl-N-β-methoxyethylaniline | bluish red |
| N-methyl-N-isopropylaniline | red |
| N-methyl-N-isobutylaniline | bluish red |
| N-ethyl-N-isopropylaniline | bluish red |
| N-isopropyl-N-isobutylaniline | bluish red |
| N-methyl-N-ethylaniline | bluish red |
| N-methyl-N-propylaniline | bluish red |
| N-ethyl-N-propylaniline | bluish red |
| N-propyl-N-isopropylaniline | bluish red |
| 2-methyl-N-methylaniline | yellowish red |
| 2-methyl-N-ethylaniline | yellowish red |
| 2-methyl-N-β-cyanoethylaniline | yellowish red |
| N-isobutylaniline | yellowish red |
| N-β-cyanoethylaniline | yellowish red |
| 2-hydroxy-B-β-cyanoethylaniline | bluish red |
| N-benzylaniline | yellowish red |
| 2-methyl-N-benzylaniline | red |
| 2-ethyl-N-β-cyanoethylaniline | red |
| 2,3-dimethyl-N-β-cyanoethylaniline | Bordeaux |
| 2,5-dimethyl-N-β-cyanoethylaniline | Bordeaux |
| 1-phenyl-3-methylpyrazoline | strongly bluish Bordeaux |
| 1,2,3,3-tetramethylindoline | red |
| 3-methyl-N-ethyl-N-β-chloroethyl aniline | Bordeaux |

| Dyestuff from 2-methyl-4-methoxy-4'-propoxybenzophenone and | Shade on polyacrylonitrile |
|---|---|
| dimethylaniline | bluish red |
| diethylaniline | bluish red |
| di-n-propylaniline | bluish red |
| di-n-butylaniline | bluish red |
| N-methyl-N-β-hydroxyethylaniline | bluish red |
| N-methyl-N-isopropylaniline | red |
| N-methyl-N-isobutylaniline | bluish red |
| N-ethyl-N-isopropylaniline | bluish red |
| N-isopropyl-N-isobutylaniline | bluish red |
| N-methyl-N-ethylaniline | bluish red |
| N-methyl-N-propylaniline | bluish red |
| N-ethyl-N-propylaniline | bluish red |
| N-propyl-N-isopropylaniline | bluish red |
| α-anilino-isobutyric acid-methylester | clear red |
| N-ethyl-o-anisidine | strongly bluish red |

| Dyestuff from 4,4'-dimethoxy-3-methyl-benzophenone and | Shade on polyacrylonitrile |
|---|---|
| dimethylaniline | red-Bordeaux |
| diethylaniline | red-Bordeaux |
| di-n-propylaniline | reddish Bordeaux |
| di-n-butylaniline | reddish Bordeaux |
| N-methyl-N-β-hydroxyethylaniline | red-Bordeaux |
| N,N-di-β-hdyroxyethylaniline | strongly bluish red |
| N-methyl-N-β-cyanoethylaniline | bluish red |
| N-butyl-N-β-chloroethylaniline | reddish Bordeaux |
| N-ethyl-N-benzylaniline | reddish Bordeaux |
| N,N-dibenzylaniline | strongly bluish red |
| N-phenylmorpholine | reddish Bordeaux |
| N,N-diisopropylaniline | red-Bordeaux |
| N-methyl-N-isopropylaniline | bluish red |
| N-methyl-N-isobutylaniline | red-Bordeaux |
| N-ethyl-N-isopropylaniline | strongly bluish red |
| N-isopropyl-N-isobutylaniline | Bordeaux |
| N-methyl-N-ethylaniline | red-Bordeaux |
| N-methyl-N-propylaniline | reddish Bordeaux |
| N-ethyl-N-propylaniline | reddish Bordeaux |
| N-propyl-N-isopropylaniline | red-Bordeaux |
| n-butylaniline | red |
| isobutylaniline | bluish red |
| α-anilino-isobutyric acid-methylester | red |
| N-methyl-o-toluidine | bluish red |
| N-ethyl-o-toluidine | somewhat bluish red |
| N-cyanoethyl-o-toluidine | red |
| N-cyanoethyl-2-ethylaniline | somewhat bluish red |
| 1,2,3,3-tetramethylindoline | Bordeaux |
| 1,3-diphenylpyrazoline | blue-green |

| Dyestuff from 4,4'-dimethoxy-2-methyl-5-chlorobenzophenone and | Shade on polyacrylonitrile |
|---|---|
| dimethylaniline | bluish red |
| diethylaniline | bluish red |
| di-n-propylaniline | bluish red |
| di-n-butylaniline | bluish red |
| N-methyl-N-β-hydroxyethylaniline | bluish red |
| N-butyl-N-β-hydroxyethylaniline | bluish red |
| N,N-di-β-hydroxyethylaniline | strongly bluish red |
| N-methyl-N-β-cyanoethylaniline | bluish red |
| N-butyl-N-β-chloroethylaniline | bluish red |
| N-methyl-N-benzylaniline | red-Bordeaux |
| N-ethyl-N-benzylaniline | bluish red |
| N-methyldiphenylamine | bluish Bordeaux |
| N-methyl-N-4-ethoxyphenylaniline | strongly bluish Bordeaux |
| N-phenylmorpholine | strongly bluish red |
| 3-ethoxy-N,N-diethylaniline | yellowish red |
| N,N-diisopropylaniline | yellowish red |
| N-methyl-Nβ-methoxyethylaniline | strongly bluish red |
| N,N-di-β-methoxyethylaniline | bluish red |
| N-methyl-N-isopropylaniline | bluish red |
| N-methyl-N-isobutylaniline | bluish red |
| N-ethyl-N-isopropylaniline | bluish red |
| N-isopropyl-N-isobutylaniline | strongly bluish red |
| N-methyl-N-ethylaniline | bluish red |
| N-methyl-N-propylaniline | bluish red |
| N-ethyl-N-propylaniline | bluish red |
| N-propyl-N-isopropylaniline | bluish red |

| Dyestuff from 4,4'-dimethoxy-2-chloro-3-methylbenzophenone and | Shade on polyacrylonitrile |
|---|---|
| dimethylaniline | red |
| diethylaniline | red |
| di-n-propylaniline | red-Bordeaux |
| di-n-butylaniline | bluish red |
| N-methyl-N-β-hydroxyethylaniline | red-Bordeaux |
| N,N-di-β-hydroxyethylaniline | bluish red |
| N-methyl-N-β-cyanoethylaniline | red-Bordeaux |
| N-butyl-N-β-chloroethylaniline | bluish red |
| N-methyl-N-benzylaniline | bluish red |
| 3-ethoxy-N,N-diethylaniline | yellowish red |
| N,N-diisopropylaniline | red |
| N-methyl-N-β-methoxyethylaniline | bluish red |
| N-methyl-N-isopropylaniline | red |
| N-methyl-N-isobutylaniline | red |
| N-ethyl-N-isopropylaniline | bluish red |
| N-isopropyl-N-isobutylaniline | bluish red |
| N-methyl-N-ethylaniline | red |
| N-methyl-N-propylaniline | bluish red |
| N-ethyl-N-propylaniline | bluish red |
| N-propyl-N-isopropylaniline | red-Bordeaux |

| Dyestuff from 4,4'-dimethoxy-2-chloro-5-methylbenzophenone and | Shade on polyacrylonitrile |
|---|---|
| dimethylaniline | red |
| diethylaniline | red |
| di-n-propylaniline | bluish red |
| di-n-butylaniline | bluish red |
| N-methyl-N-β-hydroxyethylaniline | bluish red |
| N,N-di-β-hydroxyethylaniline | strongly bluish red |
| N-methyl-N-β-cyanoethylaniline | bluish red |
| N-butyl-N-β-chloroethylaniline | strongly bluish red |
| N-methyl-N-benzylaniline | strongly bluish red |
| N-methyldiphenylamine | bluish Bordeaux |
| 3-methyl-N,N-dimethylaniline | bluish Bordeaux |
| 3-chloro-N,N-dimethylaniline | currant-blue |
| 3-methyl-N-ethyl-N-β-hydroxyethylaniline | strongly bluish Bordeaux |
| 3-ethoxy-N,N-diethylaniline | yellowish red |
| N,N-diisopropylaniline | yellowish red |
| 2-methyl-5-methoxy-N,N-dimethylaniline | granate |
| N-methyl-N-β-methoxyethylaniline | red-Bordeaux |
| N,N-di-β-methoxyethylaniline | strongly bluish red |
| N-methyl-N-isopropylaniline | bluish red |

| Component | Shade |
|---|---|
| N-methyl-N-isobutylaniline | red-Bordeaux |
| N-ethyl-N-isopropylaniline | bluish red |
| N-isopropyl-N-isobutylaniline | Bordeaux |
| N-methyl-N-ethylaniline | red |
| N-methyl-N-propylaniline | red |
| N-ethyl-N-propylaniline | bluish red |
| N-propyl-N-isopropylaniline | strongly bluish red |
| N-ethyl-2-methylaniline | yellowish red |
| 2-methyl-N-$\beta$-cyanoethylaniline | red |

Dyestuff from 4,4'-dimethoxy-3-chloro-5-methylbenzophenone and — Shade on polyacrylonitrile

| Component | Shade |
|---|---|
| dimethylaniline | red-Bordeaux |
| diethylaniline | red-Bordeaux |

Dyestuff from 4,4'-dimethoxy-2,3-dimethylbenzophenone and — Shade on polyacrylonitrile

| Component | Shade |
|---|---|
| dimethylaniline | bluish red |
| diethylaniline | bluish red |
| di-n-propylaniline | bluish red |
| di-n-butylaniline | bluish red |
| N-methyl-n-$\beta$-hydroxyethylaniline | bluish red |
| N,N-diisopropylaniline | red |
| N-methyl-N-isopropylaniline | bluish red |
| N-methyl-N-isobutylaniline | bluish red |
| N-ethyl-N-isopropylaniline | bluish red |
| N-isopropyl-N-isobutylaniline | strongly bluish red |
| N-methyl-N-ethylaniline | bluish red |
| N-methyl-N-propylaniline | bluish red |
| N-ethyl-N-propylaniline | bluish red |
| N-propyl-N-isopropylaniline | strongly bluish red |
| isobutylaniline | red |
| $\alpha$-anilino-isobutyric acid-methylester | clear yellowish red |
| N-methyl-o-toluidine | red |
| N-ethyl-o-toluidine | somewhat yellowish red |
| N-cyanoethyl-o-toluidine | red |
| N-cyanoethyl-2-ethylaniline | somewhat bluish red |

Dyestuff from 4,4'-dimethoxy-2,5-dimethylbenzophenone and — Shade on polyacrylonitrile

| Component | Shade |
|---|---|
| dimethylaniline | bluish red |
| diethylaniline | bluish red |
| di-n-propylaniline | red-Bordeaux |
| di-n-butylaniline | bluish red |
| N-methyl-N-$\beta$-hydroxyethylaniline | red-Bordeaux |
| N,N-di-$\beta$-hydroxyethylaniline | bluish red |
| N-methyl-N-$\beta$-cyanoethylaniline | red-Bordeaux |
| N-butyl-N-$\beta$-chloroethylaniline | bluish red |
| N-methyl-N-benzylaniline | bluish red |
| N-ethyl-N-benzylaniline | strongly bluish red |
| 3-ethoxy-N,N-diethylaniline | red-Bordeaux |
| N-methyl-N-$\beta$-methoxyethylaniline | bluish red |
| N-methyl-N-isopropylaniline | bluish red |
| N-methyl-N-isobutylaniline | red-Bordeaux |
| N-ethyl-N-isopropylaniline | bluish red |
| N-isopropyl-N-isobutylaniline | red-Bordeaux |
| N-methyl-N-ethylaniline | bluish red |
| N-methyl-N-propylaniline | strongly bluish red |
| N-ethyl-N-propylaniline | red-Bordeaux |
| N-propyl-N-isopropylaniline | red-Bordeaux |
| N-n-butylaniline | somewhat yellowish red |
| isobutylaniline | red |
| $\alpha$-anilino-isobutyric acid-methylester | red |
| N-methyl-o-toluidine | red |
| N-ethyl-o-toluidine | red |
| N-cyanoethyl-o-toluidine | red |
| N-cyanoethyl-2-ethylaniline | red |

Dyestuff from 4,4'-dimethoxy-3,3'-dimethylbenzophenone and — Shade on polyacrylonitrile

| Component | Shade |
|---|---|
| dimethylaniline | red-Bordeaux |
| diethylaniline | red-Bordeaux |
| di-n-propylaniline | Bordeaux |
| N-methyl-N-$\beta$-cyanoethylaniline | bluish red |
| N-methyl-N-$\beta$-hydroxyethylaniline | Bordeaux |
| N-methyl-N-benzylaniline | red-Bordeaux |
| 3-ethoxy-N,N-diethylaniline | bluish red |
| N,N-diisopropylaniline | strongly bluish red |
| N,N-di-$\beta$-methoxyethylaniline | red-Bordeaux |
| N-methyl-N-isopropylaniline | reddish Bordeaux |
| N-methyl-N-isobutylaniline | reddish Bordeaux |
| N-ethyl-N-isopropylaniline | reddish Bordeaux |
| N-isopropyl-N-isobutylaniline | Bordeaux |
| N-methyl-N-ethylaniline | strongly bluish red |
| N-methyl-N-propylaniline | reddish Bordeaux |
| N-ethyl-N-propylaniline | reddish Bordeaux |
| N-propyl-N-isopropylaniline | Bordeaux |
| 2-methyl-N-$\beta$-cyanoethylaniline | bluish red |

Dyestuff from 4,4'-dimethoxy-3,5-dimethylbenzophenone and — Shade on polyacrylonitrile

| Component | Shade |
|---|---|
| dimethylaniline | bluish red |
| diethylaniline | strongly bluish red |
| di-n-propylaniline | strongly bluish red |
| di-n-butylaniline | strongly bluish red |
| N-methyl-N-$\beta$-hydroxyethylaniline | strongly bluish red |
| N-butyl-N-$\beta$-hydroxyethylaniline | strongly bluish red |
| N,N-di-$\beta$-hydroxyethylaniline | strongly bluish red |
| N-methyl-N-$\beta$-cyanoethylaniline | bluish red |
| N-butyl-N-$\beta$-chloroethylaniline | strongly bluish red |
| N-methyl-N-benzylaniline | strongly bluish red |
| N-ethyl-N-benzylaniline | strongly bluish red |
| N-phenylmorpholine | strongly bluish red |
| 3-methyl-N,N-dimethylaniline | strongly bluish Bordeaux |
| 3-methyl-N-ethyl-N-$\beta$-hydroxyethyl aniline | strongly bluish Bordeaux |
| 3-ethoxy-N,N-diethylaniline | Bordeaux |
| 3-methoxy-N,N-dimethylaniline | red-Bordeaux |
| N,N-Diisopropylaniline | red |
| N-methyl-N-isopropylaniline | bluish red |
| N-methyl-N-isobutylaniline | strongly bluish red |
| N-ethyl-N-isopropylaniline | strongly bluish red |
| N-isopropyl-N-isobutylaniline | strongly bluish red |
| N-methyl-N-ethylaniline | bluish red |
| N-methyl-N-propylaniline | strongly bluish red |
| N-ethyl-N-propylaniline | strongly bluish red |
| N-propyl-N-isopropylaniline | red-Bordeaux |

Dyestuff from 4,4'-dimethoxy-2-methyl-6-ethylbenzophenone and — Shade on polyacrylonitrile

| Component | Shade |
|---|---|
| 2-methyl-N-methylaniline | strongly yellowish red |
| 2-methyl-N-ethylaniline | strongly yellowish red |
| 1,2,3,3-tetramethylindoline | strongly yellowish red |
| 1,3-diphenylpyrazoline | reddish blue |
| dimethylaniline | red |
| diethylaniline | red |
| di-n-propylaniline | bluish red |
| N-methyl-N-$\beta$-cyanoethylaniline | strongly bluish red |
| N-methyl-N-$\beta$-hydroxyethylaniline | bluish red |

Dyestuff from 4,4'-dimethoxy-3,3'-diethylbenzophenone and — Shade on polyacrylonitrile

| Component | Shade |
|---|---|
| dimethylaniline | strongly bluish red |
| diethylaniline | ruby |

Dyestuff from 4,4'-dimethoxy-3-isopropylbenzophenone and — Shade on polyacrylonitrile

| Component | Shade |
|---|---|
| dimethylaniline | red-Bordeaux |
| diethylaniline | red-Bordeaux |
| di-n-propylaniline | reddish Bordeaux |
| di-n-butylaniline | Bordeaux |
| N-methyl-N-$\beta$-hydroxyethylaniline | red-Bordeaux |
| N,N-di-$\beta$-hydroxyethylaniline | red-Bordeaux |
| N-methyl-N-$\beta$-cyanoethylaniline | red-Bordeaux |
| N-butyl-N-$\beta$-chloroethylaniline | red-Bordeaux |
| N-methyl-N-benzylaniline | red-Bordeaux |
| N-ethyl-N-benzylaniline | reddish Bordeaux |
| N-methyldiphenylamine | strongly bluish Bordeaux |
| N-methyl-N-4-ethoxyphenylaniline | currant-grey |
| N-phenylmorpholine | reddish Bordeaux |
| 3-methyl-N,N-dimethylaniline | currant |
| 3-ethoxy-N,N-diethylaniline | reddish Bordeaux |
| N,N-diisopropylaniline | red-Bordeaux |
| N-methyl-N-$\beta$-methoxyethylaniline | red-Bordeaux |
| N-methyl-N-isopropylaniline | strongly bluish red |
| N-methyl-N-isobutylaniline | red-Bordeaux |
| N-ethyl-N-isopropylaniline | strongly bluish red |
| N-isopropyl-N-isobutylaniline | Bordeaux |
| N-methyl-N-ethylaniline | red-Bordeaux |
| N-methyl-N-propylaniline | red-Bordeaux |
| N-ethyl-N-propylaniline | reddish Bordeaux |
| N-propyl-N-isopropylaniline | reddish Bordeaux |

Dyestuff from 4,4'-dimethoxy-3,5-diisopropylbenzophenone and — Shade on polyacrylonitrile

| | |
|---|---|
| dimethylaniline | bluish red |
| diethylaniline | bluish red |
| N-methyl-N-β-hydroxyethylaniline | strongly bluish red |
| N-methyl-N-isobutylaniline | strongly bluish red |

| Dyestuff from 2,4,4'-trimethoxy benzophenone and | Shade on polyacrylonitrile |
|---|---|
| dimethylaniline | reddish Bordeaux |
| diethylaniline | reddish Bordeaux |
| di-n-propylaniline | Bordeaux |
| di-n-butylaniline | Bordeaux |
| N-butyl-N-β-chloroethylaniline | Bordeaux |
| N-ethyl-N-β-dimethylamino-ethylaniline | Bordeaux |
| N-methyl-N-isopropylaniline | Bordeaux |
| N-ethyl-N-isopropylaniline | Bordeaux |
| N-propyl-N-isopropylaniline | Bordeaux |
| N-methyl-N-ethylaniline | reddish Bordeaux |
| N-methyl-N-propylaniline | reddish Bordeaux |
| N-ethyl-N-propylaniline | Bordeaux |
| N-methyl-N-isobutylaniline | Bordeaux |

| Dyestuff from 3,4,4'-trimethoxy benzophenone and | Shade on polyacrylonitrile |
|---|---|
| dimethylaniline | reddish Bordeaux |
| diethylaniline | Bordeaux |
| di-n-propylaniline | Bordeaux |
| di-n-butylaniline | Bordeaux |
| N-methyl-N-β-hydroxyethylaniline | Bordeaux |
| N,N-di-β-hydroxyethylaniline | Bordeaux |
| N-methyl-N-β-cyanoethylaniline | reddish Bordeaux |
| N-butyl-N-β-chloroethylaniline | Bordeaux |
| N-methyl-N-benzylaniline | Bordeaux |
| N-ethyl-N-benylaniline | Bordeaux |
| N,N-dibenzylaniline | bluish Bordeaux |
| N-methyldiphenylamine | strongly bluish Bordeaux |
| N-methyl-N-4-ethoxyphenylaniline | currant-grey |
| N-phenylmorpholine | Bordeaux |
| 3-ethoxy-N,N-diethylaniline | Bordeaux |
| N,N-diisopropylaniline | bluish red |
| N,N-di-β-methoxyethylaniline | Bordeaux |
| N-methyl-N-isopropylaniline | strongly bluish red |
| N-methyl-N-isobutylaniline | Bordeaux |
| N-ethyl-N-isopropylaniline | strongly bluish red |
| N-isopropyl-N-isobutylaniline | bluish Bordeaux |
| N-methyl-N-ethylaniline | reddish Bordeaux |
| N-methyl-N-propylaniline | Bordeaux |
| N-ethyl-N-propylaniline | Bordeaux |
| N-propyl-N-isopropylaniline | Bordeaux |
| n-butylaniline | red |
| isobutylaniline | red |
| N-cyanoethylaniline | somewhat bluish red |
| α-anilino-isobutyric acid-methylester | bluish red |
| N-methyl-o-toluidine | bluish red |
| N-ethyl-o-toluidine | somewhat bluish red |
| N-cyanoethyl-o-toluidine | somewhat bluish red |
| 1,3-diphenylpyrazoline | greenish dark-blue |
| N-phenylmorpholine | Bordeaux |
| 1,2,3,3-tetramethylindoline | Bordeaux |

| Dyestuff from 4-methoxy-4'-methyl-mercaptobenzophenone and | Shade on polyacrylonitrile |
|---|---|
| dimethylaniline | reddish Bordeaux |
| diethylaniline | reddish Bordeaux |
| di-n-propylaniline | reddish Bordeaux |
| di-n-butylaniline | reddish Bordeaux |
| N-methyl-N-β-hydroxyethylaniline | reddish Bordeaux |
| N-butyl-N-β-hydroxyethylaniline | reddish Bordeaux |
| N,N-di-β-hydroxyethylaniline | Bordeaux |
| N-methyl-N-β-cyanoethylaniline | reddish Bordeaux |
| N-butyl-N-β-chloroethylaniline | red-Bordeaux |
| N-methyl-N-benzylaniline | reddish Bordeaux |
| N-ethyl-N-benzylaniline | reddish Bordeaux |
| N-phenylmorpholine | bluish Bordeaux |
| 2-methyl-N,N-dimethylaniline | strongly bluish red |
| 3-methyl-N,N-dimethylaniline | currant |
| 3-chloro-N,N-diethylaniline | reddish blue |
| 3-methyl-N-ethyl-N-benzylaniline | currant blue |
| 3-methyl-N-ethyl-N-β-hydroxyethylaniline | currant blue |
| 3-methyl-N,N-di-β-hydroxyethylaniline | currant blue |
| 3-hydroxy-N,N-dimethylaniline | reddish Bordeaux |
| 3-hydroxy-N,N-diethylaniline | reddish Bordeaux |
| 3-ethoxy-N,N-diethylaniline | red-Bordeaux |
| 1-dimethylaminonaphthalene | strongly bluish Bordeaux |
| 1-diethylaminonaphthalene | strongly bluish Bordeaux |
| N,N-diisopropylaniline | bluish red |
| 3-methoxy-N,N-dimethylaniline | granate |
| N-methyl-N-isopropylaniline | reddish Bordeaux |
| N-ethyl-N-isopropylaniline | reddish Bordeaux |
| N-propyl-N-isopropylaniline | reddish Bordeaux |
| N-methyl-N-ethylaniline | reddish Bordeaux |
| N-methyl-N-propylaniline | reddish Bordeaux |
| N-ethyl-N-propylaniline | reddish Bordeaux |
| N-methyl-N-isobutylaniline | Bordeaux |
| N-isopropyl-N-isobutylaniline | bluish Bordeaux |
| N-isobutylaniline | red-Bordeaux |
| 2-methyl-N-methylaniline | bluish red |
| 2-methyl-N-ethylaniline | bluish red |
| 2-methyl-N-β-cyanoethylaniline | bluish red |
| 1,2,3,3-tetramethylindoline | reddish Bordeaux |
| tetrahydroquinoline | bluish red |
| 2-methyl-2,3-dihydroindole | yellowish red |
| 1-phenyl-3-methylpyrazoline | currant-blue |
| 1,3-diphenylpyrazoline | greenish dark-blue |

| Dyestuff from 4-ethoxy-4'-methyl-mercaptobenzophenone and | Shade on polyacrylonitrile |
|---|---|
| N-isobutylaniline | bluish red |
| 2-methyl-N-methylaniline | red-Bordeaux |
| 2-methyl-N-ethylaniline | red-Bordeaux |
| 2-methyl-N-β-cyanoethylaniline | red-Bordeaux |
| 1,2,3,3-tetramethylindoline | reddish Bordeaux |
| 1-phenyl-3-methylpyrazoline | reddish dark blue |
| 1,3-diphenylpyrazoline | greenish dark blue |
| N-phenylmorpholine | bluish Bordeaux |

| Dyestuff from 4-methoxy-4'-ethyl-mercaptobenzophenone and | Shade on polyacrylonitrile |
|---|---|
| N-isobutylaniline | red |
| 2-methyl-N-methylaniline | red-Bordeaux |
| 2-methyl-N-ethylaniline | red-Bordeaux |
| 2-methyl-N-β-cyanoethylaniline | bluish red |
| 1,2,3,3-tetramethylindoline | reddish Bordeaux |
| N-phenylmorpholine | bluish Bordeaux |

| Dyestuff from 4-ethoxy-4'-ethyl-mercaptobenzophenone and | Shade on polyacrylonitrile |
|---|---|
| N-isobutylaniline | bluish red |
| 2-methyl-N-methylaniline | red-Bordeaux |
| 2-methyl-N-ethylaniline | red-Bordeaux |
| 2-methyl-N-β-cyanoethylaniline | bluish red |
| 1,2,3,3-tetramethylindoline | reddish Bordeaux |
| 1-phenyl-3-methylpyrazoline | reddish navy blue |
| 1,3-diphenylpyrazoline | greenish blue |
| N-phenylmorpholine | bluish Bordeaux |

| Dyestuff from 4-methoxy-4'-methyl-mercapto-2'-methylbenzophenone and | Shade on polyacrylonitrile |
|---|---|
| N-isobutylaniline | yellowish red |
| 2-methyl-N-methylaniline | yellowish red |
| 2-methyl-N-ethylaniline | yellowish red |
| 2-methyl-N-β-cyanoethylaniline | strongly yellowish red |
| 1,2,3,3-tetramethylindoline | red |
| N-phenylmorpholine | reddish Bordeaux |

| Dyestuff from 4-methoxy-4'-methyl-mercapto-3'-methylbenzophenone and | Shade on polyacrylonitrile |
|---|---|
| N-isobutylaniline | bluish red |
| 2-methyl-N-methylaniline | red-Bordeaux |
| 2-methyl-N-ethylaniline | red-Bordeaux |
| 2-methyl-N-β-cyanoethylaniline | red-Bordeaux |
| 1,2,3,3-tetramethylindoline | reddish Bordeaux |
| 1-phenyl-3-methylpyrazoline | reddish dark blue |
| 1,3-diphenylpyrazoline | greenish dark blue |
| N-phenylmorpholine | bluish Bordeaux |

| Dyestuff from 4-methoxy-4'-ethyl-mercapto-2'-methylbenzophenone and | Shade on polyacrylonitrile |
|---|---|
| N-isobutylaniline | red |
| 2-methyl-N-methylaniline | red |
| 2-methyl-N-ethylaniline | red |
| N-phenylmorpholine | reddish Bordeaux |

| Dyestuff from dimethylaniline and | Shade on polyacrylonitrile |
|---|---|

| | |
|---|---|
| 4-methoxy-4'-ethoxy-2,5-dimethyl-benzophenone | bluish red |
| 4-methoxy-4'-ethoxy-2-methylbenzophenone | red |
| 4-methoxy-4'-ethoxy-2-chlorobenzophenone | red |
| 4-methoxy-4'-ethoxy-2'-methyl-benzophenone | red |
| 4-methoxy-4'-ethoxy-2'-methyl-5'-chlorobenzophenone | bluish red |
| 4-methoxy-4'-ethoxy-2'-chloro-5'-methylbenzophenone | red |
| 4-methoxy-4'-ethoxy-2'-chloro-benzophenone | red |
| 4-methoxy-4'-propoxy-2'-methylbenzophenone | bluish red |
| 4-methoxy-4'-ethoxy-2-chloro-5-methylbenzophenone | red |
| 3,4,5,4'-tetramethoxybenzophenone | red-Bordeaux |
| 2,4,6,4'-tetramethoxybenzophenone | strongly bluish red |
| 2,3,4,4'-tetramethoxybenzophenone | bluish red |
| 4-methoxy-4'-isobutoxybenzophenone | bluish red |
| 4-ethoxy-4'-n-propoxybenzophenone | bluish red |
| 4-methoxy-4'-ethoxybenzophenone | red-Bordeaux |
| 4-methoxy-4'-n-propoxybenzophenone | bluish red |
| 4-methoxy-4'-isopropoxybenzophenone | bluish red |
| 4-methoxy-4'-n-butoxybenzophenone | bluish red |
| 4,4'-di-n-propoxybenzophenone | bluish red |
| 4,4'-di-n-butoxybenzophenone | bluish red |
| 2-methyl-4-methoxy-4'-propoxy benzophenone | bluish red |
| 4,4'-dimethoxy-2-chlorobenzophenone | red |
| 4,4'-dimethoxy-3-chlorobenzophenone | bluish red |
| 4,4'-dimethoxy-3,3'-dichlorobenzophenone | bluish red |
| 4,4'-dimethoxy-2-methylbenzophenone | |
| 4,4'-dimethoxy-3-methylbenzophenone | red-Bordeaux |
| 4,4'-dimethoxy-2-methyl-5-chloro-benzophenone | bluish red |
| 4,4'-dimethoxy-2-chloro-3-methyl benzophenone | red |
| 4,4'-dimethoxy-2-chloro-5-methyl benzophenone | red |
| 4,4'-dimethoxy-3-chloro-5-methyl benzophenone | red-Bordeaux |
| 4,4'-dimethoxy-2,3-dimethylbenzophenone | bluish red |
| 4,4'-dimethoxy-2,5-dimethylbenzophenone | bluish red |
| 4,4'-dimethoxy-3,3'-dimethylbenzophenone | red-Bordeaux |
| 4,4'-dimethoxy-3,5-dimethylbenzophenone | bluish red |
| 4,4'-dimethoxy-2-bromobenzophenone | red |
| 4,4'-dimethoxy-3-bromobenzophenone | bluish red |
| 4,4'-dimehtoxy-2-methyl-6-ethyl-benzophenone | red |
| 4,4'-dimethoxy-3,3'-diethylbenzophenone | strongly bluish red |
| 4,4'-dimethoxy-3-isopropylbenzophenone | red-Bordeaux |
| 4,4'-dimethoxy-3,5-diisopropyl benzophenone | bluish red |
| 3,4,4'-trimethoxybenzophenone | reddish Bordeaux |

| Dyestuff from 2-methyl-N-methyl-aniline and | Shade on polyacrylonitrile |
|---|---|
| 4-methoxy-4'-ethoxybenzophenone | bluish red |
| 4,4'-diethoxybenzophenone | bluish red |
| 4-ethoxy-4'-propoxybenzophenone | red |
| 4,4'-di-n-propoxybenzophenone | red |

| Dyestuff from dimethylaniline and | Shade on polyacrylonitrile |
|---|---|
| 4-methoxy-4'-ethoxy-2,5-dimethyl benzophenone | bluish red |
| 4-methoxy-4'-ethoxy-2-methylbenzophenone | red |
| 4-methoxy-4'-ethoxy-2-chlorobenzophenone | red |
| 4-methoxy-4'-ethoxy-2'-methylbenzophenone | red |
| 4-methoxy-4'-ethoxy-4'-methyl-5'-chlorobenzophenone | bluish red |
| 4-methoxy-4'-ethoxy-2'-chloro-5'-methylbenzophenone | red |
| 4-methoxy-4'-ethoxy-2'-chloro benzophenone | red |
| 4-methoxy-4'-propoxy-2'-methyl benzophenone | bluish red |
| 4-methoxy-4'-ethoxy-2-chloro-5-methylbenzophenone | red |
| 3,4,5,4'-tetramethoxybenzophenone | red-Bordeaux |
| 2,4,6,4'-tetramethoxybenzophenone | strongly bluish red |
| 2,3,4,4'-tetramethoxybenzophenone | bluish red |
| 4-methoxy-4'isobutoxybenzophenone | bluish red |
| 4-ethoxy-4'-n-propoxybenzophenone | bluish red |

| Dyestuff from N-methyldiphenyl amine and | Shade on polyacrylonitrile |
|---|---|
| 4-methoxy-4'-ethoxybenzophenone | bluish Bordeaux |
| 4,4'-diethoxybenzophenone | strongly bluish Bordeaux |
| 4,4'-di-n-propoxybenzophenone | strongly bluish Bordeaux |
| 4,4'-di-n-butoxybenzophenone | strongly bluish Bordeaux |

| Dyestuff from N-methyl-N-4-ethoxy phenylaniline and | Shade on polyacrylonitrile |
|---|---|
| 4-methoxy-4'-ethoxybenzophenone | currant |
| 4,4'-diethoxybenzophenone | currant-grey |
| 4,4'-di-n-propoxybenzophenone | bluish currant |

| Dyestuff from 3-methyl-N,N-dimethyl aniline and | Shade on polyacrylonitrile |
|---|---|
| 4,4'-dimethoxybenzophenone | currant |
| 4,4'-dimethoxy-2-chloro-5-methyl benzophenone | bluish Bordeaux |
| 4,4'-dimethoxy-3,5-dimethylbenzophenone | bluish Bordeaux |
| 4,4'-dimethoxy-3-isopropylbenzophenone | currant |

| Dyestuff from 3-chloro-N,N-dimethyl-aniline and | Shade on polyacrylonitrile |
|---|---|
| 4,4'-dimethoxybenzophenone | currant-blue |
| 4,4'-dimethoxy-2-chloro-5-methyl-benzophenone | currant-blue |
| 4,4'-dimethoxy-3,5-dimethylbenzophenone | strongly bluish Bordeaux |

| Dyestuff from N-methyldiphenyl amine and | Shade on polyacrylonitrile |
|---|---|
| 4,4'-dimethoxy-2-chlorobenzophenone | bluish Bordeaux |
| 4,4'-dimethoxy-2-methyl-5-chloro benzophenone | bluish Bordeaux |
| 4,4'-dimethoxy-2-chloro-5-methyl benzophenone | bluish Bordeaux |
| 4,4'-dimethoxy-3-isopropylbenzophenone | strongly bluish Bordeux |
| 3,4,4'-trimethoxybenzophenone | strongly bluish Bordeaux |

| Dyestuff from N-Methyl-N-(4-ethoxyphenyl)-aniline and | Shade on polyacrylonitrile |
|---|---|
| 4,4'-dimethoxy-2-chlorobenzophenone | strongly bluish Bordeaux |
| 4,4'-dimentoxy-2-methyl-5-chloro benzophenone | strongly bluish Bordeaux |
| 4,4'-dimethoxy-3-isopropylbenzo pheone | currant-grey |
| 3,4,4'-trimethoxybenzophenone | currnat-grey |

| Dyestuff from 2-methyl-N-methyl-aniline and | Shade on polyacrylonitrile |
|---|---|
| 4,4'-dimethoxybenzophenone | bluish red |
| 4,4'-dimethoxy-2-methyl-6-ethyl-benzophenone | strongly yellowish red |

| Dyestuff from 3-methoxy-N,N-dimethyl-aniline and | Shade on polyacrylonitrile |
|---|---|
| 4,4'-dimethoxy-2-chlorobenzophenone | yellowish red |
| 4,4'-dimethoxy-3,5-dimethylbenzophenone | red-Bordeaux |
| 4,4'-dimethoxy-3,3'-dimethylbenzophenone | bluish red |

| Dyestuff from 2-methyl-5-methoxy-N,N-dimethylaniline and 4,4'-dimethoxy-2-chloro-5-methylbenzophenone | Shade on polyacrylonitrile granate |
|---|---|

| Dyestuff from 4,4'-dimethoxy-2-bromobenzophenone and | Shade on polyacrylonitrile |
|---|---|
| diethylaniline | red |
| di-n-propylaniline | bluish red |
| diisopropylaniline | yellowish red |
| di-n-butylaniline | bluish red |
| N-methyl-N-ethyaniline | red |
| N-methyl-N-propylaniline | bluish red |
| N-ethyl-N-propylaniline | bluish red |
| isobutylaniline | somewhat yellowish red |
| N-methyl-o-toluidine | yellowish red |
| N-ethyl-o-toluidine | somewhat yellowish red |
| N-cyanoethyl-o-toluidine | somewhat bluish red |
| 1,2,3,3-tetramethylindoline | somewhat bluish red |

| Dyestuff from 4,4'-dimethoxy-3-bromobenzophenone and | Shade on polyacrylonitrile |
|---|---|
| diethylaniline | bluish red |
| di-n-propylaniline | bluish red |
| N,N-diisopropylaniline | red |
| di-n-butylaniline | strongly bluish red |
| N-methyl-N-ethylaniline | bluish red |
| N-methyl-N-propylaniline | bluish red |
| N-ethyl-N-propylaniline | bluish red |

| Dyestuff from 4-methoxy-4'-ethoxy-2-methylbenzophenone and | Shade on polyacrylonitrile |
|---|---|
| diethylaniline | bluish red |
| di-n-propylaniline | bluish red |
| diisopropylaniline | yellowish red |
| di-n-butylaniline | bluish red |
| N-methyl-N-ethylaniline | bluish red |
| N-methyl-N-propylaniline | bluish red |
| N-ethyl-N-propylaniline | bluish red |

| Dyestuff from 4-methoxy-4'-ethoxy-2,5-dimethylbenzophenone and | Shade on polyacrylonitrile |
|---|---|
| diethylaniline | bluish red |
| di-n-propylaniline | red-Bordeaux |
| di-n-butylaniline | red-Bordeaux |
| N-methyl-N-ethylaniline | bluish red |

| Dyestuff from 4-methoxy-4'-ethoxy-2-chlorobenzophenone and | Shade on polyacrylonitrile |
|---|---|
| diethylaniline | red |
| di-n-propylaniline | bluish red |
| N-methyl-N-ethylaniline | red |
| N-methyl-N-propylaniline | red |
| N-ethyl-N-propylaniline | bluish red |
| α-anilino-isobutyric acid-methylester | somewhat bluish red |
| isobutylaniline | red |
| N-methyl-o-toluidine | red |
| N-ethyl-o-toluidine | red |
| N-cyanoethyl-o-toluidine | somewhat bluish red |
| N-cyanoethyl-2-ethylaniline | somewhat bluish red |

| Dyestuff from 4-methoxy-4'-ethoxy-2'-methylbenzophenone and | Shade on polyacrylonitrile |
|---|---|
| diethylaniline | bluish red |
| di-n-propylaniline | bluish red |
| di-n-butylaniline | bluish red |
| N-methyl-N-ethylaniline | red |
| N-methyl-N-propylaniline | bluish red |
| N-ethyl-N-propylaniline | bluish red |
| isobutylaniline | red |
| N-methyl-o-toluidine | red |
| N-ethyl-o-toluidine | red |
| N-cyanoethyl-o-toluidine | red |
| N-n-propyl-o-toluidine | red |
| N-i-propyl-o-toluidine | red |
| N-n-butyl-o-toluidine | red |
| α-anilino-isobutyric acid-methylester | strongly bluish scarlet |
| 1,2,3,3-tetramethylindoline | bluish red |

| Dyestuff from 4-methoxy-4'-ethoxy-2'-methyl-5'-chlorobenzophenone and | Shade on polyacrylonitrile |
|---|---|
| diethylaniline | bluish red |
| di-n-propylaniline | bluish red |
| N-methyl-N-ethylaniline | bluish red |
| N-methyl-N-propylaniline | bluish red |
| N-ethyl-N-propylaniline | bluish red |

| Dyestuff from 4-methoxy-4'-ethoxy-2'-chlorobenzophenone and | Shade on polyacrylonitrile |
|---|---|
| diethylaniline | red |
| di-n-propylaniline | bluish red |
| N-methyl-N-ethylaniline | bluish red |
| N-methyl-N-propylaniline | red |
| N-ethyl-N-propylaniline | bluish red |

| Dyestuff from 4-methoxy-4'-ethoxy-2'-chloro-5'-methylbenzophenone and | Shade on polyacrylonitrile |
|---|---|
| diethylaniline | red |
| di-n-propylaniline | bluish red |
| N-methyl-N-ethylaniline | red |
| N-methyl-N-propylaniline | bluish red |
| N-ethyl-N-propylaniline | bluish red |

| Dyestuff from 4-methoxy-4'-n-propoxy-2'-methylbenzophenone and | Shade on polyacrylonitrile |
|---|---|
| diethylaniline | bluish red |
| di-n-propylaniline | bluish red |
| N-methyl-N-ethylaniline | red |
| N-methyl-N-propylaniline | red |
| N-ethyl-N-propylaniline | bluish red |

| Dyestuff from 4-methoxy-4'-ethoxy-2-chloro-5-methylbenzophenone and | Shade on polyacrylonitrile |
|---|---|
| diethylaniline | red |
| di-n-propylaniline | bluish red |
| N-methyl-N-ethylaniline | red |
| N-methyl-N-propylaniline | red |
| N-ethyl-N-propylaniline | bluish red |

| Dyestuff from 3,4,5,4'-tetramethoxybenzophenone and | Shade on polyacrylonitrile |
|---|---|
| diethylaniline | red-Bordeaux |

| Dyestuff from 2,4,6,4'-tetramethoxybenzophenone and | Shade on polyacrylonitrile |
|---|---|
| diethylaniline | strongly bluish red |

| Dyestuff from 2,3,4,4'-tetramethoxybenzophenone and | Shade on polyacrylonitrile |
|---|---|
| diethylaniline | bluish red |
| di-n-propylaniline | strongly bluish red |

| Dyestuff from 4-methoxy-4'-isobutoxybenzophenone and | Shade on polyacrylonitrile |
|---|---|
| diethylaniline | strongly bluish red |
| α-anilino-isobutyric acid-methylester | clear red |
| N-ethyl-o-anisidine | Bordeaux |

| Dyestuff from 4-ethoxy-4'-n-propoxy benzophenone and | Shade on polyacrylonitrile |
|---|---|
| diethylaniline | bluish red |
| di-n-propylaniline | strongly bluish red |
| diisopropylaniline | bluish red |
| di-n-butylaniline | strongly bluish red |
| N-methyl-N-ethylaniline | bluish red |
| N-methyl-N-propylaniline | bluish red |
| N-ethyl-N-propylaniline | strongly bluish red |

| Dyestuff from 4-n-propoxy-2'-chlorobenzophenone and | Shade on polyacrylonitrile |
|---|---|

| | Shade on polyacrylonitrile |
|---|---|
| dimethylaniline | bluish red |
| diethylaniline | somewhat bluish red |
| di-n-propylaniline | bluish red |
| N-methyl-N-β-cyanoethylaniline | clear ruby |
| n-butylaniline | yellowish red |
| isobutylaniline | yellowish red |
| N-methyl-o-toluidine | yellowish red |
| N-ethyl-o-toluidine | yellowish red |
| N-cyanoethyl-o-toluidine | bluish red |
| 1,2,3,3-tetramethylindoline | yellowish red |
| N-phenylmorpholine | strongly bluish red |

Dyestuff from 4-n-butoxy-2'-chlorobenzophenone and — Shade on polyacrylonitrile

| | |
|---|---|
| dimethylaniline | somewhat bluish red |
| diethylaniline | red |
| di-n-propylaniline | somewhat bluish red |
| N-methyl-N-β-cyanoethylaniline | ruby |
| 3-diethylaminophenetole | strongly yellowish red |
| isobutylaniline | yellowish red |
| N-methyl-o-toluidine | somewhat yellowish red |
| N-ethyl-o-toluidine | red |
| N-cyanoethyl-o-toluidine | bluish red |
| N-benzyl-o-toluidine | somewhat bluish red |
| N-phenylmorpholine | red-Bordeaux |
| 1,2,3,3-tetramethylindoline | yellowish red |
| 1,3-diphenylpyrazoline | strongly bluish violet |

Dyestuff from 4,4'-dimethoxy-2-methyl-5-isopropylbenzophenone and — Shade on polyacrylonitrile

| | |
|---|---|
| isobutylaniline | red |
| α-anilino-isobutyric acid-methylester | bluish red |
| N-methyl-o-toluidine | red |
| N-ethyl-o-toluidine | red |
| N-cyanoethyl-o-toluidine | somewhat bluish red |
| N-cyanoethyl-2-ethylaniline | somewhat bluish red |

Dyestuff from 3,4-dimethoxy-2'-chlorobenzophenone and — Shade on polyacrylonitrile

| | |
|---|---|
| dimethylaniline | strongly bluish red |
| diethylaniline | strongly bluish red |
| di-n-propylaniline | reddish Bordeaux |
| 3-diethylaminophenetole | yellowish brick-red |
| n-butylaniline | bluish red |
| isobutylaniline | somewhat bluish red |
| N-methyl-o-toluidine | red |
| N-cyanoethyl-o-toluidine | strongly bluish red |
| N-ethyl-o-toluidine | somewhat bluish red |
| N-cyanoethyl-2-ethylaniline | ruby |
| 1,2,3,3-tetramethylindoline | red |

Dyestuff from 3,4-dimethoxy-2'-bromobenzophenone and — Shade on polyacrylonitrile

| | |
|---|---|
| dimethylaniline | strongly bluish red |
| diethylaniline | strongly bluish red |
| di-n-propylaniline | Bordeaux |
| 3-diethylaminophenetole | brick-red |
| n-butylaniline | somewhat bluish red |
| isobutylaniline | somewhat bluish red |
| N-methyl-o-toluidine | yellowish red |
| N-ethyl-o-toluidine | yellowish red |
| N-cyanoethyl-o-toluidine | strongly bluish red |
| 1,2,3,3-tetramethylindoline | red |

Dyestuff from 4-phenoxy-2'-chlorobenzophenone and — Shade on polyacrylonitrile

| | |
|---|---|
| N-methyl-o-toluidine | orange |
| N-ethyl-o-toluidine | orange |
| dimethylaniline | strongly reddish orange |
| diethylaniline | strongly yellowish red |
| di-n-propylaniline | strongly yellowish red |

Dyestuff from 4-phenoxy-2'-methyl-benzophenone and — Shade on polyacrylonitrile

| | |
|---|---|
| dimethylaniline | yellowish scarlet |
| diethylaniline | yellowish scarlet |
| di-n-propylaniline | strongly yellowish red |
| methyl-cyanoethylaniline | somewhat yellowish red |
| methyl-hydroxyethylaniline | somewhat yellowish red |
| N-butyl-β-chloroethylaniline | somewhat yellowish red |
| N-ethyl-N-β-dimethylaminoethyl aniline | strongly bluish red |
| N,N-dimethyl-m-toluidine | yellowish red |
| N-ethyl-N-β-dimethylaminoethyl-m-toluidine | Bordeaux |
| N-ethyl-N-benzyl-m-toluidine | strongly bluish red |
| N,N-diethyl-m-phenetidine | orange |
| N-methyl-diphenylamine | Bordeaux |
| n-butylaniline | somewhat reddish orange |
| isobutylaniline | somewhat reddish orange |
| α-anilino-isobutyric acid-methylester | yellowish scarlet |
| N-cyanoethylaniline | yellowish scarlet |
| N-benzylaniline | yellowish scarlet |
| N-methyl-o-toluidine | somewhat reddish orange |
| N-ethyl-o-toluidine | somewhat reddish orange |
| N-isopropyl-o-toluidine | somewhat reddish orange |
| N-n-butyl-o-toluidine | somewhat reddish orange |
| N-cyanoethyl-o-toluidine | yellowish scarlet |
| N-cyanoethyl-2-ethylaniline | yellowish scarlet |
| N-benzyl-o-toluidine | scarlet |
| N-n-butyl-m-toluidine | brownish red |
| N-ethyl-2-ethylaniline | orange |
| N-ethyl-2-chloroaniline | bluish red |
| N-ethyl-o-anisidine | strongly yellowish red |
| 1,2,3,3-tetramethylindoline | somewhat reddish orange |
| N-phenylmorpholine | somewhat yellowish red |

Dyestuff from α-anilino-isobutyric acid-methylester and — Shade on polyacrylonitrile

| | |
|---|---|
| 2,4'-dimethoxy-benzophenone | bluish red |
| 2-methoxy-4'-ethoxy-benzophenone | bluish red |
| 2,4'-dimethoxy-3'-methyl-benzophenone | strongly bluish red |
| 2-methoxy-4'-propoxy-benzophenone | strongly bluish red |
| 2,4'-dimethoxy-2'-methyl-5'-chloro-benzophenone | clear strongly yellowish red |
| 2,4'-dimethoxy-2'-chloro-benzophenone | copper-red |
| 2,4'-dimethoxy-2'-chloro-5'-methyl-benzophenone | yellowish red |
| 2,5,4'-trimethoxy-benzophenone | strongly bluish red |
| 2,4,6,4'-tetramethoxy-benzophenone | strongly bluish red |
| 4,4'-diethoxybenzophenone | clear red |
| 4-ethoxy-4'-propoxybenzophenone | red |
| 4-methoxy-4'-isopropoxybenzophenone | clear yellowish red |
| 4,4'-dimethoxy-3,3'-dimethyl benzophenone | clear red |
| 4,4'-dimethoxy-3,5-dimethyl-benzophenone | clear somewhat bluish red |
| 4,4'-dimethoxy-3,5-diisopropyl-benzophenone | bluish red |
| 4,4'-dimethoxy-3-chlorobenzophenone | strongly bluish red |
| 4,4'-dimethoxy-3-bromobenzophenone | somewhat bluish red |
| 4,4'-dimethoxy-2-methylbenzophenone | clear yellowish red |
| 4-methoxy-4'-propoxy-2'-methyl benzophenone | red |
| 4,4'-dimethoxy-2-methyl-5-chloro benzophenone | clear red |
| 4-methoxy-4'-ethoxy-2'-methyl-5'-chlorobenzophenone | clear red |
| 4-methoxy-4'-ethoxy-2'chloro benzophenone | bluish red |
| 4,4'-dimethoxy-2-chloro-3-methyl-benzophenone | somewhat bluish red |
| 4,4'-dimethoxy-2-chloro-5-methyl-benzophenone | red |
| 4-methoxy-4'-ethoxy-2'-chloro-5'-methylbenzophenone | bluish red |
| 4-methoxy-4'-ethoxy-2-chloro-5'-methylbenzophenone | bluish red |

What is claimed is:

1. A process for the dyeing or printing of shaped materials wherein polymers or copolymers of acrylonitrile or as.dicyanoethylene, or of acid-modified aromatic polyesters, or acidemodified superpolyamides, are dyed or printed with a triaryl-methane compound which is free from sulphonic acid and carboxylic acid groups and has the formula

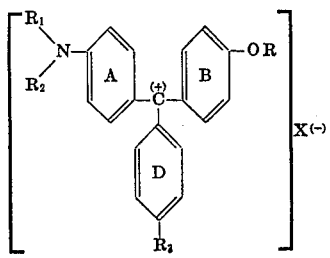

in which R is alkyl, aralkyl, cycloalkyl or aryl; $R_1$ is hydrogen, alkyl, aralkyl, or cycloalkyl; $R_2$ is alkyl, aralkyl, cycloalkyl or aryl; $R_1$ and $R_2$ additionally including divalent alkylene when joined together with the nitrogen atom or with a carbon atom in the O-positioned in ring A to form a heterocyclic ring; $R_3$ is hydrogen, alkyl, aralkyl, aryl, alkoxy, aralkoxy, aryloxy, halogen, carboxylic acid ester radical, carbonamido, sulphonamido, cyano, nitro, alkylsulphonyl, aralkyl-sulphonyl, arylsulphonyl, acyl, alkylmercapto or arylmercapto; X is the radical of an anion.

2. Process of claim 1, wherein $R_3$ is H, $CH_3$ or $OCH_3$.

3. Process of claim 1, wherein phenylene ring A, B and/or D contains an anellated six-membered monocyclic radical.

4. Process of claim 1 for the dyeing and printing of shaped materials of polymers or copolymers of acrylonitrile or of as.dicyanoethylene, or of acid-modified aromatic polyesters or superpolyamides wherein the dyestuff employed is a triarylmethane compound which is free from sulphonic acid and carboxylic acid groups and has the formula

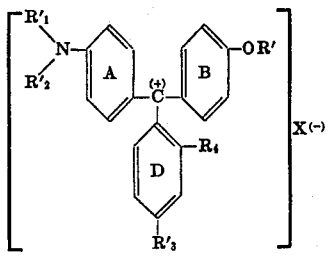

in which $R'$, $R'_1$ and $R'_2$ are substituted or unsubstituted lower alkyl wherein said alkyl contains one to four carbon atoms and $R'_1$ and $R'_2$ include alkylene when joined with the nitrogen atom or with a carbon atom in the O-positioned of the phenylene ring A to form a heterocyclic ring; $R'_3$ is hydrogen or lower alkyl of one to four carbon atoms; $R_4$ is hydrogen, chlorine, bromine, lower alkyl of one to four carbon atoms or lower alkoxy of one to four carbon atoms; and X is the radical of an anion.

5. Process of claim 4, wherein the phenylene radical D is substituted by a lower alkyl in addition to the substitutents $R'_3$ and $R_4$.

6. Process of claim 4 wherein $R'_3$ is alkoxy.

7. Process of claim 1 wherein the dyestuff is a triarylmethane compound which is free from sulphonic acid and carboxylic acid groups and has the formula

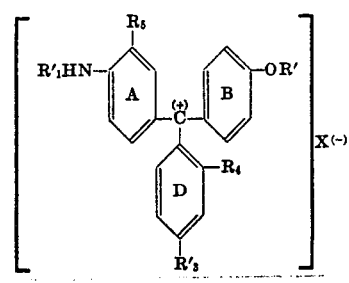

wherein $R'$, $R'_1$, $R'_3$, $R_4$ and X have the same meaning as in claim 4, and $R_5$ is hydrogen or lower alkyl of one to four carbon atoms.

8. Shaped materials of polymers or copolymers of acrylonitrile or of as.dicyanoethylene, or of acid-modified aromatic polyesters, or of acid-modified superpolyamides when dyed or printed by the process of claim 1.

* * * * *